(12) United States Patent
Ahn et al.

(10) Patent No.: US 11,825,558 B2
(45) Date of Patent: *Nov. 21, 2023

(54) WIRELESS COMMUNICATION METHOD USING ENHANCED DISTRIBUTED CHANNEL ACCESS, AND WIRELESS COMMUNICATION TERMINAL USING SAME

(71) Applicants: WILUS INSTITUTE OF STANDARDS AND TECHNOLOGY INC., Gyeonggi-do (KR); SK TELECOM CO., LTD., Seoul (KR)

(72) Inventors: Woojin Ahn, Gyeonggi-do (KR); Juhyung Son, Gyeonggi-do (KR); Geonjung Ko, Seoul (KR); Jinsam Kwak, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/979,767

(22) Filed: Nov. 3, 2022

(65) Prior Publication Data
US 2023/0055982 A1   Feb. 23, 2023

Related U.S. Application Data

(63) Continuation of application No. 17/383,475, filed on Jul. 23, 2021, now Pat. No. 11,523,464, which is a
(Continued)

(30) Foreign Application Priority Data

Sep. 7, 2016 (KR) .................. 10-2016-0114822
Sep. 10, 2016 (KR) .................. 10-2016-0116877
(Continued)

(51) Int. Cl.
*H04W 80/02* (2009.01)
*H04W 74/00* (2009.01)
(Continued)

(52) U.S. Cl.
CPC ........... *H04W 80/02* (2013.01); *H04L 5/0055* (2013.01); *H04W 28/0268* (2013.01);
(Continued)

(58) Field of Classification Search
CPC ............ H04W 80/02; H04W 28/0268; H04W 74/0808; H04W 40/244; H04W 74/08;
(Continued)

(56) References Cited

U.S. PATENT DOCUMENTS 10,966,251 B2   3/2021  Ahn et al.
11,116,035 B2 *  9/2021  Ahn .................. H04W 40/244
(Continued)

FOREIGN PATENT DOCUMENTS

CN          103563457          2/2014
CN          104255068          12/2014
(Continued)

OTHER PUBLICATIONS

Hearing Notice dated Jan. 24, 2023 for Indian Patent Application No. 201927007972.
(Continued)

*Primary Examiner* — Mandish K Randhawa
(74) *Attorney, Agent, or Firm* — Ladas & Parry, LLP

(57) ABSTRACT

Provided is a wireless communication terminal that communicates wirelessly. The wireless communication terminal
(Continued)

```
ACCESS A CHANNEL ACCORDING TO A
PRIORITY OF DATA TO BE TRANSMITTED      ─ S2801

│
           ▼

TRANSMIT THE DATA THROUGH THE
       ACCESSED CHANNEL                  ─ S2803
``` includes a transceiver and a processor for processing a radio signal received through the transceiver or a radio signal to be transmitted through the transceiver. The processor accesses a channel according to according to a priority of data to be transmitted to the base communication terminal by the wireless communication terminal.

10 Claims, 26 Drawing Sheets

Related U.S. Application Data continuation of application No. 16/294,883, filed on Mar. 6, 2019, now Pat. No. 11,116,035, which is a continuation of application No. PCT/KR2017/009841, filed on Sep. 7, 2017.

(30) Foreign Application Priority Data

| Sep. 12, 2016 | (KR) | 10-2016-0116965 |
| Sep. 13, 2016 | (KR) | 10-2016-0117898 |
| Sep. 23, 2016 | (KR) | 10-2016-0122488 |
| Nov. 6, 2016 | (KR) | 10-2016-0147189 |
| Feb. 20, 2017 | (KR) | 10-2017-0022227 |

(51) Int. Cl.

| H04W 84/12 | (2009.01) |
| H04W 74/08 | (2009.01) |
| H04L 5/00 | (2006.01) |
| H04W 28/02 | (2009.01) |
| H04W 40/24 | (2009.01) |
| H04W 72/0446 | (2023.01) |

(52) U.S. Cl.
CPC ..... *H04W 40/244* (2013.01); *H04W 72/0446* (2013.01); *H04W 74/00* (2013.01); *H04W 74/08* (2013.01); *H04W 74/0808* (2013.01); *H04W 84/12* (2013.01)

(58) Field of Classification Search
CPC . H04W 84/12; H04W 74/00; H04W 72/0446; H04L 5/0055
See application file for complete search history.

(56) References Cited

U.S. PATENT DOCUMENTS

| 11,516,879 B2* | 11/2022 | Ahn ..................... H04W 40/244 |
| 11,523,464 B2* | 12/2022 | Ahn ..................... H04W 74/00 |
| 2003/0145095 A1 | 7/2003 | Liu et al. |
| 2010/0081393 A1 | 4/2010 | Huang |
| 2010/0150116 A1 | 6/2010 | Ji et al. |
| 2014/0254552 A1 | 9/2014 | Hayes et al. |
| 2015/0063105 A1 | 3/2015 | Liu et al. |
| 2015/0124689 A1 | 5/2015 | Merlin et al. |
| 2015/0124690 A1 | 5/2015 | Merlin et al. |
| 2015/0146648 A1 | 5/2015 | Viger et al. |
| 2015/0245382 A1 | 8/2015 | Park et al. |
| 2015/0295680 A1 | 10/2015 | Othman et al. |
| 2016/0057657 A1 | 2/2016 | Seok |
| 2016/0066257 A1 | 3/2016 | Liu et al. |
| 2016/0080115 A1 | 3/2016 | Joshiam et al. |
| 2016/0112987 A1 | 4/2016 | Patil et al. |
| 2016/0113009 A1 | 4/2016 | Seok |
| 2016/0113034 A1 | 4/2016 | Seok |
| 2016/0127020 A1 | 5/2016 | Abraham et al. |
| 2016/0183274 A1 | 6/2016 | Trainin et al. |
| 2016/0198500 A1 | 7/2016 | Merlin |
| 2016/0227579 A1 | 8/2016 | Stacey et al. |
| 2016/0302229 A1 | 10/2016 | Hedayat |
| 2016/0315681 A1 | 10/2016 | Moon et al. |
| 2016/0316458 A1 | 10/2016 | Kwon |
| 2017/0019909 A1 | 1/2017 | Si et al. |
| 2017/0202023 A1 | 7/2017 | Zhou et al. |
| 2017/0230981 A1 | 8/2017 | Ryu et al. |
| 2017/0245261 A1 | 8/2017 | Cariou et al. |
| 2017/0257196 A1 | 9/2017 | Ghosh et al. |
| 2017/0257887 A1 | 9/2017 | Ghosh et al. |
| 2017/0272138 A1 | 9/2017 | Chun et al. |
| 2017/0289911 A1 | 10/2017 | Kim et al. |
| 2017/0303280 A1 | 10/2017 | Chun et al. |
| 2017/0310446 A1 | 10/2017 | Hi et al. |
| 2017/0325264 A1 | 11/2017 | Cherian et al. |
| 2018/0084605 A1 | 3/2018 | Li et al. |
| 2018/0145801 A1 | 5/2018 | Wang et al. |
| 2018/0167882 A1 | 6/2018 | Choi et al. |
| 2018/0302924 A1 | 10/2018 | Kim et al. |
| 2019/0069299 A1 | 2/2019 | Li et al. |
| 2019/0182864 A1 | 6/2019 | Huang et al. |
| 2019/0208571 A1 | 7/2019 | Ahn et al. |
| 2019/0313453 A1 | 10/2019 | Baron et al. |
| 2021/0352760 A1 | 11/2021 | Ahn et al. |

FOREIGN PATENT DOCUMENTS

| CN | 104321995 | 1/2015 |
| CN | 104871630 | 8/2015 |
| CN | 105830506 | 8/2016 |
| GB | 201518866 | 12/2015 |
| IN | 201847021036 | 6/2018 |
| JP | 2015-50650 | 3/2015 |
| JP | 2018-509024 | 3/2018 |
| KR | 10-2013-0009959 | 1/2013 |
| KR | 10-2014-0116909 | 10/2014 |
| KR | 10-2015-0011345 | 1/2015 |
| KR | 10-2015-0013465 | 2/2015 |
| KR | 10-1512731 | 4/2015 |
| KR | 10-2015-0073165 | 6/2015 |
| KR | 10-2016-0022790 | 3/2016 |
| KR | 10-2016-0028354 | 3/2016 |
| KR | 10-2016-0031954 | 3/2016 |
| KR | 10-2016-0045023 | 4/2016 |
| WO | 2014/098367 | 6/2014 |
| WO | 2015/194727 | 12/2015 |
| WO | 2015/199306 | 12/2015 |
| WO | 2016/007770 | 1/2016 |
| WO | 2016/068572 | 5/2016 |
| WO | 2016/112146 | 7/2016 |
| WO | 2016/123403 | 8/2016 |
| WO | 2018/016784 | 1/2018 |
| WO | 2018/048229 | 3/2018 |

OTHER PUBLICATIONS

Office Action dated Feb. 15, 2023 for U.S. Appl. No. 17/851,035.
Office Action dated Feb. 14, 2023 for U.S. Appl. No. 17/873,148.
Notice of Allowance dated Mar. 10, 2023 for Chinese Patent Application No. 201780058494.0 and its English translation provided by Applicant's foreign counsel.
Notice of Allowance dated Mar. 14, 2023 for U.S. Appl. No. 17/185,940.
Notice of Allowance dated Aug. 5, 2021 for Korean Patent Application No. 10-2019-7008304 and its English translation provided by Applicant's foreign counsel.
Notice of Allowance dated Sep. 20, 2021 for European Patent Application No. 17 849 113.0.
Notice of Allowance dated Dec. 13, 2021 for Korean Patent Application No. 10-2021-7017548 and its English translation provided by Applicant's foreign counsel.
Notice of Allowance dated Mar. 4, 2022 for Korean Patent Application No. 10-2019-7006093 and its English translation provided by Applicant's foreign counsel.
Office Action dated Oct. 25, 2022 for Chinese Patent Application No. 201780058494.0 and its English translation provided by Applicant's foreign counsel.
Notice of Allowance dated Oct. 28, 2022 for Chinese Patent Application No. 201780054732.0 and its English translation provided by Applicant's foreign counsel.

(56) References Cited

OTHER PUBLICATIONS

Office Action dated Nov. 22, 2022 for Korean Patent Application No. 10-2022-7032282 and its English translation provided by Applicant's foreign counsel.
International Search Report for PCT/KR2017/009841 dated Jan. 9, 2018 and its English translation from WIPO (now published as WO 2018/048229).
Written Opinion of the International Searching Authority for PCT/KR2017/009841 dated Jan. 9, 2018 and its English translation by Google Translate (now published as WO 2018/048229).
Laurent Cariou et al., "Motivation: Improving HE STAs UL performance", IEEE 802.11-16/0998r0, Jul. 2016, Slides 1-21 created on created on Jul. 25, 2016.
Laurent Cariou et al., "Motivation: Improving HE STAs UL performance", IEEE 802.11-16/0998r1, Jul. 2016, Slides 1-33 created on Jul. 25, 2016.
Laurent Cariou et al., "Motivation: Improving HE STAs UL performance", IEEE 802.11-16/0998r2, Jul. 2016, Slides 1-32 created on Sep. 12, 2016.
Laurent Cariou et al., "Motivation: Improving HE STAs UL performance", IEEE 802.11-16/0998r3, Jul. 2016, Slides 1-32 created on Sep. 12, 2016.
International Preliminary Report on Patentability (Chapter I) dated Mar. 12, 2019 for PCT/KR2017/009841 and its English translation from WIPO.
Notice of Allowance dated Jul. 10, 2019 for U.S. Appl. No. 16/233,078.
Non-Final Office Action dated Mar. 18, 2019 for U.S. Appl. No. 16/233,078.
Office Action dated Dec. 16, 2019 for Japanese Patent Application No. 2019-534619 and its English translation provided by the Applicant's foreign counsel.
Office Action dated Feb. 3, 2020 for Japanese Patent Application No. 2019-500497 and its English translation provided by the Applicant's foreign counsel.
Extended European Search Report dated Feb. 10, 2020 for European Patent Application No. 17824568.4.
Laurent Cariou et al. "2 Sets of EDCA Parameters", IEEE 802.11-160998r0, IEEE, Jul. 2016, Search Date Dec. 5, 2019, Internet URL: https://mentor.ieee.org/802.11/dcn/16/11-16-0998-00-00ax-rules-for-2-edcaparameters.pptx >. Slides 1-21.
Robert Stacey, "Specification Framework for TGax", IEEE 802.11-15/0132r17, IEE P802.11. Internet URL: https://mentor.ieee.org/802.11/den/15/11-15-0132-17-00ax-spec-framework.docx>, May 25, 2016, pp. 33-34.
Chittabrata Ghosh (Intel): "Signaling of Multi-TID Aggregation Limit", IEEE 802.11-160667r0, Draft: 11-16-0667-00-00AX-Signaling-of-Multi-Tid-Aggregation-Limit, IEEE-SA Mentor, Piscataway, NJ USA, vol. 802.11ax, May 16, 2016, pp. 1-16, XP068119549, Internet URL: https://mentor.ieee.org/802.11/den/16/11-16-0667-00-00ax-signaling-of-multi-tid-aggregation-limit.pptx (retrieved May 16, 2016).
Chittabrata Ghosh (Intel): "Multi-TID Aggregation Limit", IEEE 802.11-16/0362r1, Draft: 11-16-0362-01-00AX-Multi-Tid-Aggregation-Limit, IEEE-SA Mentor, Piscataway, NJ USA, vol. 802.11ax, No. 1, May 15, 2016, pp. 1-26, XP068105245, Internet URL: https://mentor.ieee.org/802.11/den/16/11-16-0667-00-00ax-signaling-of-multi-tid-aggregation-limit.pptx (retrieved on Mar. 15, 2016).
LAN/MAN Standards Committee of the IEEE Computer Society; "Draft Standard for Information technology—tele-communications and information exchange between systems Local and metropolitan area networks—Specific requirements, Part 11: Wireless LAN Medium Access Control (MAC) and Physical Layer (PHY) Specifications. Amendment 6: Enhancements for high efficiency in frequency bands between 1 GHz and 6Ghz", IEEE Draft; Draft P802.11ax_D0.2, IEEE-SA, Piscataway, NJ USA, vol. 802.11ax drafts, No. D0.2, Jun. 8, 2016. Pages 1-227, XP068137424, Retrieved from the Internet: URL: www.ieee802.org/11/private/Draft_Standards/11ax/DraftP802.11ax DO.2.pdf (Retrieved on Jun. 8, 2016).
Laurent Cariou et al.: "Proposed spec text for MU EDCA parameters", Resolution for CID 9058 and 9075, IEEE P802.11, Wireless LANS, Sep. 1, 2016, pp. 1-8.
Office Action dated Apr. 16, 2020 for U.S. Appl. No. 16/188,274.
Office Action dated May 14, 2020 for U.S. Appl. No. 16/361,283.
Laurent Cariou et al.: "Proposed spec text for MU EDCA parameters", Resolution for CID 9058 and 90751, IEEE P802.11, Wireless LANs, Sep. 1, 2016. See pp. 1-7.
Notice of Allowance dated Jun. 18, 2020 for Korean Patent Application No. 10-2020-7002361 and its English translation provided by the Applicant's foreign counsel.
Extended European Search Report dated May 12, 2020 for European Patent Application No. 17849113.0.
Notice of Allowance dated Jun. 22, 2020 for Japanese Patent Application No. 2019- 500497 and its English translation provided by the Applicant's foreign counsel.
Office Action dated Jun. 29, 2020 for Japanese Patent Application No. 2019-534619 and its English translation provided by Applicant's foreign counsel.
Office Action dated Jul. 28, 2020 for U.S. Appl. No. 16/596,674.
Notice of Allowance dated Aug. 18, 2020 for U.S. Appl. No. 16/188,274.
Notice of Allowance dated Sep. 15, 2020 for Korean Patent Application No. 10-2020-7026125 and its English translation provided by Applicant's foreign counsel.
Office Action dated Sep. 3, 2020 for Korean Patent Application No. 10-2018-7033463 and its English translation provided by Applicant's foreign counsel.
Evgeny Khorov et al., "Considerations on Trigger Frame for Random Access Procedure", doc. IEEE 802.11-16/0399r1, Mar. 2016, slides 1-11.
Office Action dated Sep. 9, 2020 for Indian Patent Application No. 201927007972.
Office Action dated Mar. 16, 2021 for Indian Patent Application No. 201927012269.
Jin Soo Ahn et al.: "MU mode EDCA control", IEEE 802.11-16/1220r1, Sep. 14, 2016. Yonsei University, slides 1.
Office Action dated Mar. 22, 2021 for Korean Patent Application No. 10-2019-7006093 and its English translation provided by the Applicant's foreign counsel.
Notice of Allowance dated Apr. 20, 2021 for U.S. Appl. No. 16/596,674.
Office Action dated Apr. 19, 2021 for European Patent Application No. 17 824 568.4.
Office Action dated Jun. 14, 2021 for Japanese Patent Application No. 2020-125358 and its English translation provided by the Applicant's foreign counsel.
Office Action dated Jun. 14, 2021 for Japanese Patent Application No. 2020-125359 and its English translation provided by the Applicant's foreign counsel.
Kiseon Ryu, "Ack Policy for UL MU ACK transmission", IEEE 802.11-15/1346r1, Internet URL:https://mentor.ieee.org/802.11/dcn/15/11-15-1346-01-00ax-ack-policy-for-ul-mu-ack-transmisssion.ppx, Nov. 8, 2015.
Po-Kai Huang (Intel), Comment Resolution on Trigger Frame Format—MU-RTS Variant, IEEE 802.11-160808r0, Internet URL: https://mentor.ieee.orr/802.11/dcn/16/11-16-0808-00-00ax-comment-resolution-on-trieegr-frame-format-mu-rts-variant.docs, Jun. 28, 2016.
Notice of Allowance dated Apr. 23, 2021 for U.S. Appl. No. 16/294,883 (now published as US 2019/0208571).
Notice of Allowance dated Jan. 19, 2021 for U.S. Appl. No. 16/294,883 (now published as US 2019/0208571).
Office Action dated Jun. 23, 2020 for U.S. Appl. No. 16/294,883 (now published as US 2019/0208571).
Office Action dated Sep. 22, 2021 for Korean Patent Application No. 10-2019-7006093 and its English translation provided by the Applicant's foreign counsel.
Office Action dated Oct. 4, 2021 for Japanese Patent Application No. 2019-534619 and its English translation provided by the Applicant's foreign counsel.
Office Action dated Oct. 25, 2021 for U.S. Appl. No. 16/935,858.
Office Action dated Nov. 8, 2021 for U.S. Appl. No. 17/100,880.
Office Action dated Nov. 9, 2021 for U.S. Appl. No. 17/101,755.

(56) References Cited

OTHER PUBLICATIONS

Office Action dated Nov. 22, 2021 for Japanese Patent Application No. 2020-125359 and its English translation provided by Applicant's foreign counsel.
Office Action dated Nov. 22, 2021 for Japanese Patent Application No. 2020-125358 and its English translation provided by Applicant's foreign counsel.
Office Action dated Nov. 19, 2021 for Chinese Patent Application No. 201780036198.0 and its English translation provided by Applicant's foreign counsel.
Notice of Allowance dated Nov. 22, 2021 for European Patent Application No. 17 889 408.5.
Office Action dated Dec. 2, 2021 for Korean Patent Application No. 10-2021-7036247 and its English translation provided by Applicant's foreign counsel.
Notice of Allowance dated Dec. 2, 2021 for Korean Patent Application No. 10-2021-7036248 and its English translation provided by Applicant's foreign counsel.
Office Action dated Dec. 27, 2021 for Indian Patent Application No. 202128005900.
Office Action dated Dec. 9, 2021 for Chinese Patent Application No. 201780041848.0 and its English translation provided by Applicant's foreign counsel.
Notice of Allowance dated Dec. 13, 2021 for European Patent Application No. 17 824 568.4.
Notice of Allowance dated Mar. 25, 2022 for U.S. Appl. No. 16/935,858.
Office Action dated Mar. 24, 2022 for Chinese Patent Application No. 201780058494.0 and its English translation provided by Applicant's foreign counsel.
Office Action dated Mar. 25, 2022 for Chinese Patent Application No. 201780054732.0 and its English translation provided by Applicant's foreign counsel.
Notice of Allowance dated Apr. 6, 2022 for U.S. Appl. No. 17/100,880.
Corrected Notice of Allowance dated Apr. 25, 2022 for U.S. Appl. No. 17/100,880.
Notice of Allowance dated Apr. 20, 2022 for Korean Patent Application No. 10-2022-7008125 and its English translation from Global Dossier.
Trial and Appeal Decision dated Apr. 25, 2022 for Japanese Patent Application No. 2019-534619 and its English translation provided by Applicant's foreign counsel.
Office Action dated Apr. 29, 2022 for Chinese Patent Application No. 201780036198.0 and its English translation from Global Dossier.
IEEE P802.11ax/D1.0: "High Efficiency (HE) MAC specification", IEEE-SA Piscataway, NJ, USA, Nov. 2016, pp. 1-65.
Notice of Allowance dated May 18, 2022 for U.S. Appl. No. 17/101,755.
Corrected Notice of Allowance dated Jun. 15 and Jun. 2, 2022 for U.S. Appl. No. 17/101,755.
Office Action dated May 7, 2022 for Chinese Patent Application No. 201780041848.0 and its English translation provided by Applicant's foreign counsel.
Notice of Allowance dated May 16, 2022 for Japanese Patent Application No. 2020-125358 and its English translation provided by Applicant's foreign counsel.
Notice of Allowance dated May 16, 2022 for Japanese Patent Application No. 2020-125359 and its English translation provided by Applicant's foreign counsel.
Corrected Notice of Allowance dated May 26, 2022 for U.S. Appl. No. 16/935,858.
Notice of Allowance dated Jun. 17, 2022 for Korean Patent Application No. 10-2021-7036247 and its English translation provided by Applicant's foreign counsel.
Extended European Search Report dated May 13, 2022 for European Patent Application No. 22152570.2.
Pre-Appeal Examination Report dated Jan. 4, 2021 for Japanese Patent Application No. 2019-534619 and its English translation provided by Applicant's foreign counsel.
Office Action dated Jun. 25, 2021 for Korean Patent Application No. 10-2021-7017548 and its English translation provided by Applicant's foreign counsel.
Extended European Search Report dated Jul. 5, 2022 for European Patent Application No. 22166225.7.
Yongho Seok et al.: "HE MU Acknowledgement Procedure", IEEE 802.11-15/1278r1, Piscataway, NJ, USA, Nov. 10, 2015, Slides 1-13.
Notice of Allowance dated Jul. 19, 2022 for Korean Patent Application No. 10-2022-7018628 and its English translation provided by Applicant's foreign counsel.
Notice of Allowance dated Jul. 25, 2022 for Korean Patent Application No. 10-2022-7018630 and its English translation provided by Applicant's foreign counsel.
Corrected Notice of Allowance dated Aug. 4, 2022 for U.S. Appl. No. 17/101,755.
Office Action dated Aug. 1, 2022 for Chinese Patent Application No. 201780036198.0 and its English translation provided by Applicant's foreign counsel.
Notice of Allowance dated Aug. 3, 2022 for Chinese Patent Application No. 201780041848.0 and its English translation provided by Applicant's foreign counsel.
Notice of Allowance dated Sep. 21, 2022 for U.S. Appl. No. 17/383,479.
Office Action dated Sep. 28, 2022 for U.S. Appl. No. 17/185,940.
Office Action dated Sep. 28, 2022 for Korean Patent Application No. 10-2022-7025209 and its English translation provided by Applicant's foreign counsel.
Notice of Allowance dated Oct. 13, 2022 for U.S. Appl. No. 17/185,959.
Office Action dated Oct. 21, 2022 for Korean Patent Application No. 10-2022-7030653 and its English translation provided by Applicant's foreign counsel.
Notice of Allowance dated Sep. 9, 2022 for U.S. Appl. No. 17/383,475 (now published as US 2021/0352760).
Notice of Allowance dated Jun. 9, 2023 for U.S. Appl. No. 17/873,148.
Notice of Allowance dated Jun. 14, 2023 for U.S. Appl. No. 17/851,035.
Office Action dated Jun. 26, 2023 for Japanese Patent Application No. 2022-096603 and its English translation provided by Applicant's foreign counsel.
Notice of Allowance dated Jul. 10, 2023 for U.S. Appl. No. 17/851,035.
Hearing Notice dated Jul. 11, 2023 for Indian Patent Application No. 201827048972.
Notification of Reexamination dated Jul. 27, 2023 for Chinese Patent Application No. 201780036198.0 and its English translation provided by Applicant's foreign counsel.
Notice of Allowance dated Jun. 30, 2023 for Vietnamese Patent Application No. 1-2019-00644 and its English translation provided by Applicant's foreign counsel.
Notice of Allowance dated Aug. 16, 2023 for Korean Patent Application No. 10-2022-7030653 and its English translation provided by Applicant's foreign counsel.
Notice of Allowance dated Jul. 25, 2023 for European Patent Application No. 22 166 225.7.
Office Action dated Aug. 25, 2023 for Korean Patent Application No. 10-2022-7025209 and its English translation provided by Applicant's foreign counsel.
Office Action dated Sep. 19, 2023 for Korean Patent Application No. 10-2022-7032282 and its English translation provided by Applicant's foreign counsel.
Notice of Allowance dated Sep. 25, 2023 for Vietnamese Patent Application No. 1-2019-01737 and its English translation provided by Applicant's foreign counsel.

* cited by examiner (a) Data Enabled Immediate Response A-MPDU context

| Ack policy: immediate response TID: 1 | Ack policy: immediate response TID: 1 | Ack policy: immediate response TID: 2 | Ack policy: No Ack TID: 3 | Action |

QoS Data frames (No Ack) can be aggregated optionally in an A-MPDU with Data enabled Immediate Response context (b) Data Enabled No Immediate Response A-MPDU context

| Ack policy: No Ack TID: 1 | Ack policy: No Ack TID: 1 | Ack policy: No Ack TID: 2 | Ack policy: No Ack TID: 3 | Action No Ack |

QoS Data frames (No Ack) from multiple TIDs

*FIG. 17*

WIRELESS COMMUNICATION METHOD USING ENHANCED DISTRIBUTED CHANNEL ACCESS, AND WIRELESS COMMUNICATION TERMINAL USING SAME

CROSS-REFERENCE TO RELATED APPLICATIONS

This application is a continuation of U.S. patent application Ser. No. 17/383,475 filed on Jul. 23, 2021, which is a continuation of U.S. patent application Ser. No. 16/294,883 filed on Mar. 6, 2019, now issued as U.S. Pat. No. 11,116,035 dated Sep. 7, 2021, which is a continuation of International Patent Application No. PCT/KR2017/009841 filed on Sep. 7, 2017, which claims the priority to Korean Patent Application No. 10-2016-0114822 filed in the Korean Intellectual Property Office on Sep. 7, 2016, Korean Patent Application No. 10-2016-0116877 filed in the Korean Intellectual Property Office on Sep. 10, 2016, Korean Patent Application No. 10-2016-0116965 filed in the Korean Intellectual Property Office on Sep. 12, 2016, Korean Patent Application No. 10-0117898 filed in the Korean Intellectual Property Office on Sep. 13, 2016, Korean Patent Application No. 10-2016-0122488 filed in the Korean Intellectual Property Office on Sep. 23, 2016, Korean Patent Application No. 10-2016-0147189 filed in the Korean Intellectual Property Office on Nov. 6, 2016 and Korean Patent Application No. 10-2017-0022227 filed in the Korean Intellectual Property Office on Feb. 20, 2017, the entire contents of which are incorporated herein by reference.

TECHNICAL FIELD

The present invention relates to wireless communication method and a wireless communication terminal using enhanced distributed channel access.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Especially, as the number of devices using a wireless communication technology increases, it is necessary to efficiently use a predetermined channel Therefore, required is a technology capable of efficiently using bandwidths by simultaneously transmitting data between a plurality of terminals and base terminals.

DISCLOSURE

Technical Problem

An object of an embodiment of the present invention is to provide a wireless communication terminal using enhanced distributed channel access.

Technical Solution

According to an embodiment of the present invention, a wireless communication terminal that wirelessly communicates with a base wireless communication terminal includes: a transceiver; and a processor for processing a radio signal received through the transceiver or a radio signal to be transmitted through the transceiver. The processor is configured to access a channel according to a priority of data to be transmitted to the base communication terminal by the wireless communication terminal.

The processor may be configured to switch a parameter set, which is a set of parameters used for the channel access, from a first parameter set to a second parameter set based on whether the base wireless communication terminal triggers a multi-user uplink transmission participation of the wireless communication terminal.

The processor may be configured to transmit the trigger-based physical layer protocol data unit (PPDU) to the base wireless communication terminal using the transceiver, set a second parameter set timer according to an immediate response reception based on whether an immediate response to a MAC protocol data unit (MPDU) included in the trigger-based PPDU is received, and when the second parameter set timer expires, terminate the application of the second parameter set.

The processor may be configured to set the second parameter set timer when the immediate response reception ends.

The processor may be configured to set the second parameter set timer for an access category of an MPDU for which the immediate response is received.

The processor may be configured to determine when to set the second parameter set timer based on a type of responding requested by the MPDU included in the trigger-based PPDU.

When the MPDU included in the trigger-based PPDU does not request an ACK, the processor may be configured to set the second parameter set timer when the transmission of the trigger-based PPDU ends.

The MPDU included in the trigger-based PPDU may be a QoS data frame.

The processor may be configured to receive a beacon frame from the base wireless communication terminal and obtain information indicating a period of the second parameter set timer from the beacon frame.

When switching the parameter set from the first parameter set to the second parameter set, the processor may be configured to set the second parameter set timer.

The processor may be configured to calculate a random integer value in a contention window (CW), set a backoff timer based on the random integer value, and access a channel based on the back off timer and a predetermined slot time, wherein the parameter set may include a minimum value (CWmin) of the CW and a maximum value (CWmax) of the CW.

The processor may be configured to calculate a random integer value in a contention window (CW), set a backoff timer based on the random integer value, access a channel based on the back off timer and a predetermined slot time, and when a value of the CW is greater than the maximum value (CWmax) of the CW according to a priority of the traffic, set the value of the CW to the CWmax.

The processor may be configured to operate a plurality of queues that are classified according to an access category of data stored in a queue and perform a backoff procedure of accessing a channel based on a time corresponding to a backoff timer in each of the plurality of queues, and when there is no data stored in the queue and the backoff timer corresponding to the queue is 0, perform no operation at a slot boundary of the backoff timer, wherein the backoff timer may be set based on a random integer value calculated within a contention window (CW), and may be reduced when the channel is idle for a predetermined slot time.

When there is no data stored in the queue and the backoff timer corresponding to the queue is 0, the processor may be configured to maintain the backoff timer to be 0.

According to an embodiment of the present invention, an operation method of a wireless communication terminal that wirelessly communicates with a base wireless communication terminal includes: accessing a channel according to a priority of data to be transmitted to the base wireless communication terminal; and transmitting the data through the channel.

The accessing of the channel may include: switching a parameter set, which is a set of parameters used for the channel access, from a first parameter set to a second parameter set based on whether the base wireless communication terminal triggers a multi-user uplink transmission participation of the wireless communication terminal; and accessing a channel using a second set of parameters based on a priority of the traffic to be transmitted to the base communication terminal by the wireless communication terminal.

The method may further include transmitting a trigger-based PPDU to the base wireless communication terminal using the transceiver, wherein the switching from the first parameter set to the second parameter set may include: setting a second parameter set timer according to an immediate response reception based on whether an immediate response to a MAC protocol data unit (MPDU) included in the trigger-based PPDU is received, and when the second parameter set timer expires, terminating the application of the second parameter set.

The setting of the second parameter set timer may include setting the second parameter set timer when the immediate response reception ends.

The setting of the second parameter set timer may include setting the second parameter set timer for an access category of an MPDU for which the immediate response is received.

The setting of the second parameter set timer may determine when to set the second parameter set timer based on a type of responding requested by the MPDU included in the trigger-based PPDU.

The setting of the second parameter set timer may include setting the second parameter set timer when transmission of the trigger based PPDU ends when the MPDU included in the trigger based PPDU does not request an ACK.

Advantageous Effects

An embodiment of the present invention provides a wireless communication method using enhanced distributed channel access and a wireless communication terminal using the same.

DESCRIPTION OF DRAWINGS

FIG. 17 shows an A-MPDU generated by a wireless communication terminal according to an embodiment of the present invention and a type of responding for a corresponding A-MPDU.

MODE FOR CARRYING OUT THE INVENTION

Figure 1:
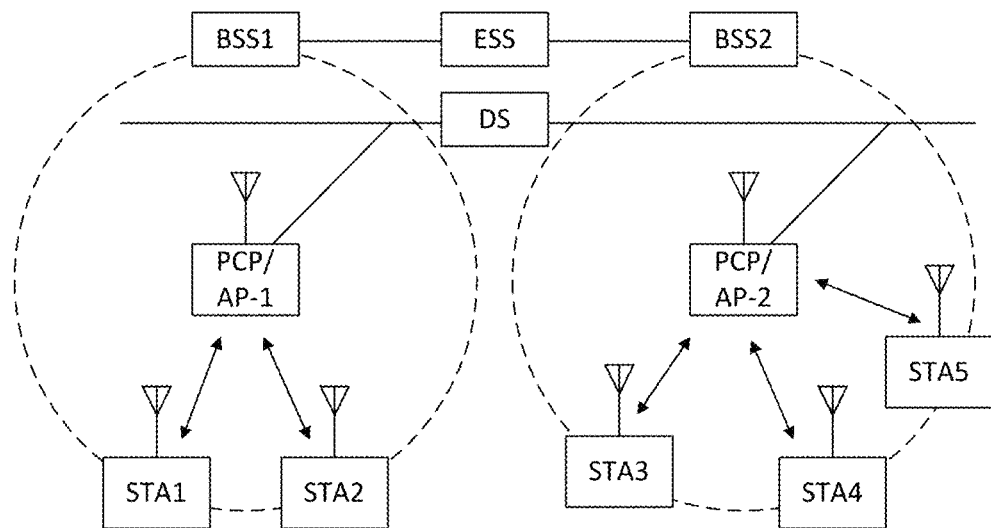
FIG. 1 shows a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2016-0114822 (2016.09.07), Nos. 10-2016-0116877 (2016 Sep. 10), Nos. 10-2016-0116965 (2016 Sep. 12), Nos. 10-2016-0117898 (2016 Sep. 13), Nos. 10-2016-0122488 (2016 Sep. 23), Nos. 10-2016-0147189 (2016 Nov. 6), and Nos. 10-2017-0022227 (2017 Feb. 20) filed in the Korean Intellectual Property Office and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
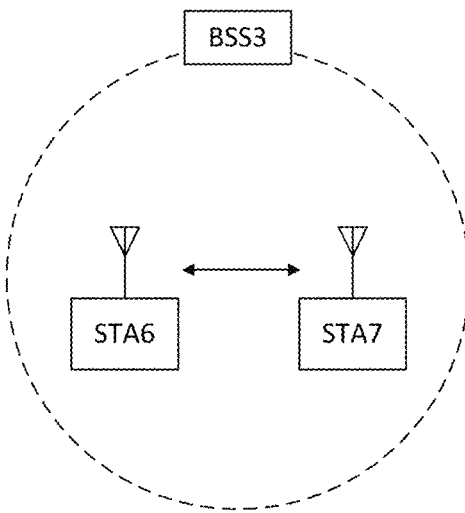
FIG. 2 shows a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
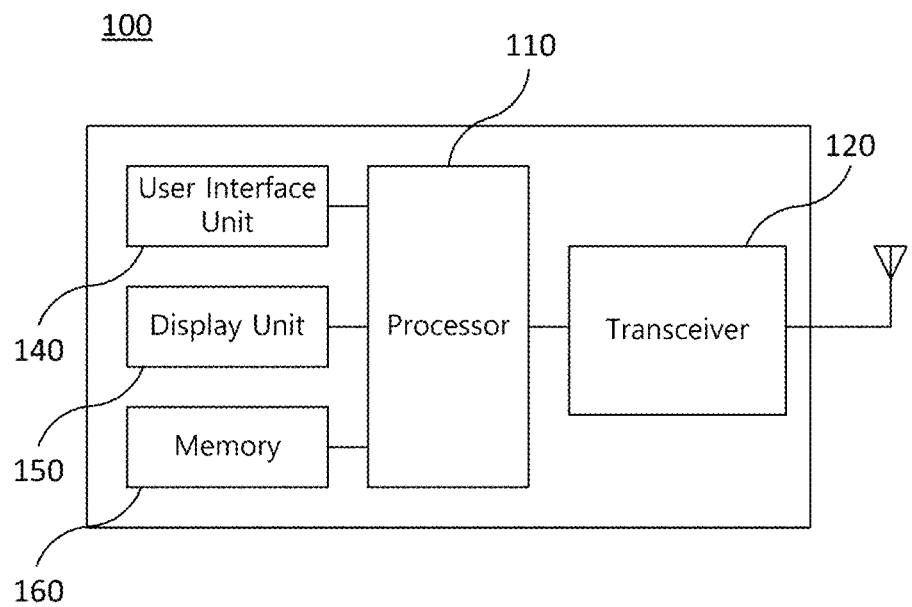
FIG. 3 shows a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
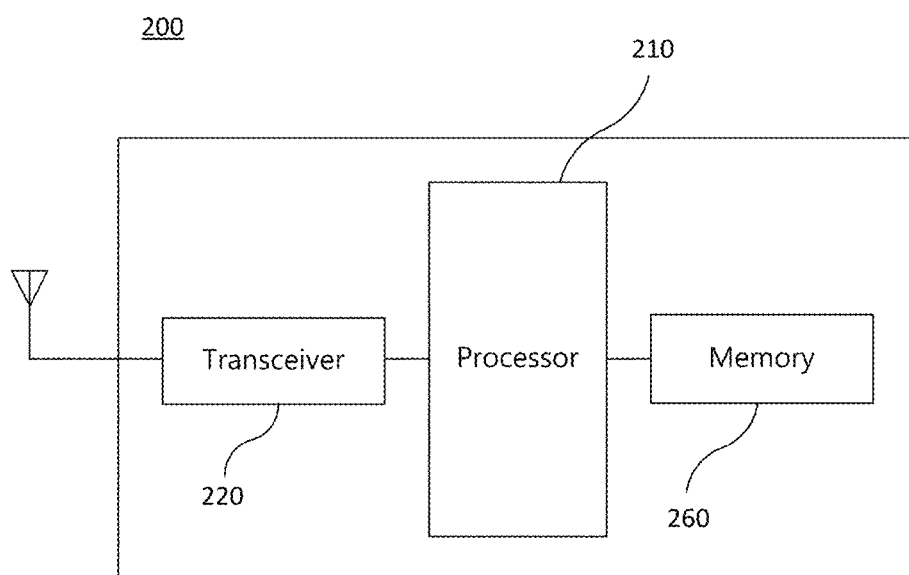
FIG. 4 shows a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
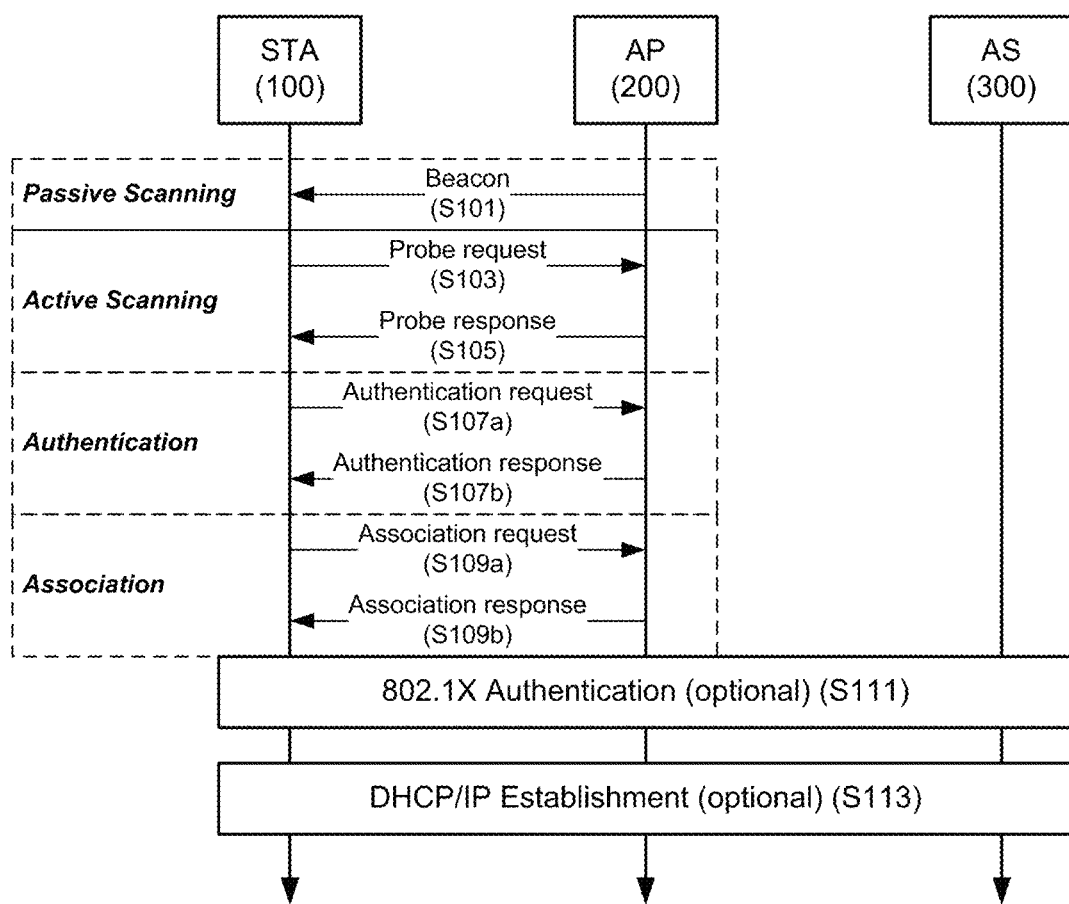
FIG. 5 shows a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

In a specific embodiment, the AP 200 may be a wireless communication terminal that allocates a communication medium resource and performs scheduling in an independent network, such as an ad-hoc network, which is not connected to an external distribution service. In addition, the AP 200 may be at least one of a base station, an eNB, and a transmission point TP. The AP 200 may also be referred to as a base wireless communication terminal.

In a frequency band commonly used by various wireless communication devices, such as an unlicensed band, a wireless communication terminal may access the channel through a contention procedure. Specifically, if the channel to be accessed by the wireless communication terminal is idle for a predetermined time, the wireless communication terminal starts the backoff procedure. In the backoff procedure, the wireless communication terminal obtains a random integer value in a contention window (CW) and sets the random integer value as a backoff timer. If the corresponding channel is idle during a predetermined slot time, the wireless communication terminal decreases the backoff timer. If the value of the backoff timer is 0, the wireless communication terminal accesses the corresponding channel. At this time, if the corresponding channel is busy, the wireless communication terminal stops the backoff procedure. If the channel to be accessed by the wireless communication terminal is idle for a predetermined time, the wireless communication terminal resumes the backoff procedure again.

Further, the wireless communication terminal may access the channel according to the priority of the data to be transmitted. Specifically, the wireless communication terminal may use the CW determined according to the priority of the data to be transmitted. At this time, the minimum value CWmin and the maximum value CWmax of CW are determined according to the priority of data to be transmitted by the wireless communication terminal. In addition, the predetermined time at which the wireless communication terminal waits to start the backoff procedure is determined according to the priority of the data to be transmitted by the wireless communication terminal. Also, the wireless communication terminal may wait for a designated time according to the priority of the data to be transmitted, and then start the backoff procedure. The designated time according to the priority is referred to as arbitration interframe space (AIFS). This operation is referred to as enhanced distributed channel access (EDCA). In addition, the priority of data may be determined according to an access category (AC).

The base wireless communication terminal may trigger uplink transmission of one or more wireless communication terminals to the base wireless communication terminal. At this time, one or more wireless communication terminals may perform uplink transmission to a base wireless communication terminal using Orthogonal Frequency-Division Multiple Access (OFDMA). Further, the base wireless communication terminal transmits trigger information to one or more wireless communication terminals through a trigger frame or a MAC header to trigger uplink transmissions for the base wireless communication terminal of one or more wireless communication terminals. At this time, the base wireless communication terminal accesses the channel for uplink transmission of one or more wireless communication terminals. In addition, one or more wireless communication terminals access the channel for uplink transmission of each of the one or more wireless communication terminals. Therefore, when the uplink transmission of one or more wireless communication terminals is scheduled for uplink transmission by the base wireless communication terminal, the uplink transmission of one or more wireless communication terminals has a higher priority than transmission of other wireless communication terminals that transmit data having the same priority. In addition, since the base wireless communication terminal and one or more wireless communication terminals simultaneously access the channel for the same transmission, the channel access efficiency may decrease. Therefore, when the uplink multi-user (UL-MU) transmission is scheduled, it is necessary to adjust the EDCA parameter value.

In a frequency band commonly used by various wireless communication devices, such as an unlicensed band, a wireless communication terminal may access the channel through a contention procedure. Specifically, if the channel to be accessed by the wireless communication terminal is idle for a predetermined time, the wireless communication terminal starts the backoff procedure. In the backoff procedure, the wireless communication terminal obtains a random integer value within a contention window (CW) and sets the random integer value as a backoff timer. When the corresponding channel is idle during a predetermined slot time, the wireless communication terminal decreases the backoff timer. When the value of the backoff timer is 0, the wireless communication terminal accesses the corresponding channel. At this time, when the corresponding channel is busy, the wireless communication terminal stops the backoff procedure. When the channel to be accessed by the wireless communication terminal is idle for a predetermined time, the wireless communication terminal resumes the backoff procedure again.

Further, the wireless communication terminal may access the channel according to the priority of the data to be transmitted. Specifically, the wireless communication terminal may use the CW determined according to the priority of the data to be transmitted. At this time, the minimum value CWmin and the maximum value CWmax of CW are determined according to the priority of data to be transmitted by the wireless communication terminal. In addition, the predetermined time at which the wireless communication terminal waits to start the backoff procedure is determined according to the priority of the data to be transmitted by the wireless communication terminal. Also, the wireless communication terminal may wait for a designated time according to the priority of the data to be transmitted, and then start the backoff procedure. The designated time according to the priority is referred to as arbitration interframe space (AIFS). This operation is referred to as enhanced distributed channel access (EDCA). In addition, the priority of data may be determined according to an access category (AC).

Figure 6:
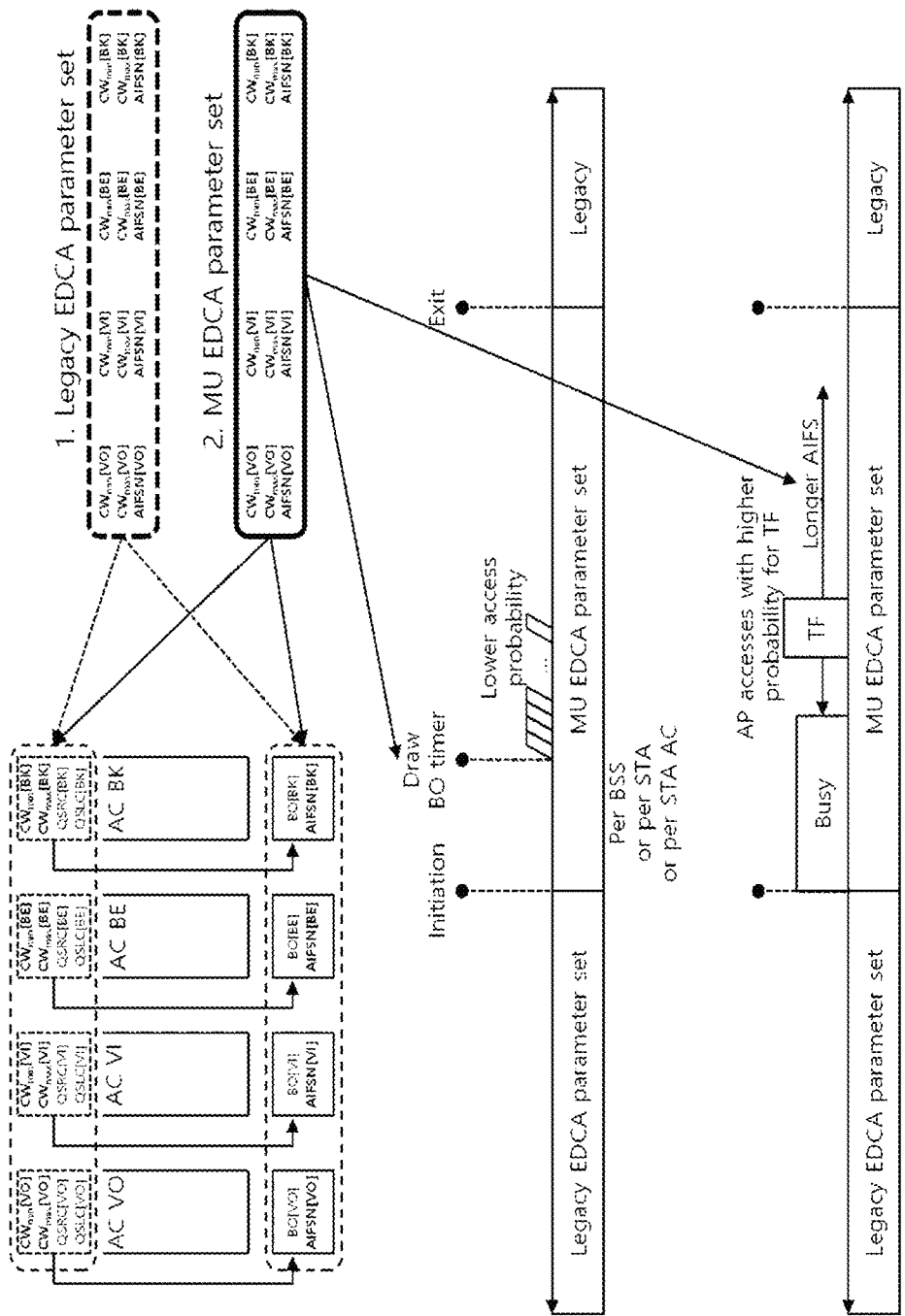
FIG. 6 shows that a wireless communication terminal according to an embodiment of the present invention adjusts EDCA parameters according to UL MU transmission.

FIG. 6 shows that a wireless communication terminal according to an embodiment of the present invention adjusts EDCA parameters according to UL MU transmission.

A wireless communication terminal that is scheduled for UL MU transmission may use a channel access method to ensure channel access success with a lower probability than when it is not scheduled for UL MU transmission. Specifically, a wireless communication terminal scheduled for UL MU transmission may use a separate EDCA parameter set. In a specific embodiment, a wireless communication terminal scheduled for UL MU transmission may use an EDCA parameter set that attempts to access the channel with a lower probability than the previously used EDCA parameter set in channel access for transmitting the same data. At this time, the EDCA parameter set is a set of parameters used in the EDCA operation according to the priority of the data transmitted by the wireless communication terminal. Specifically, the EDCA parameter set may include parameters for CW. At this time, the parameter for CW may include at least one of CWmin and CWmax. In addition, the EDCA parameter set may include a parameter value related to a predetermined time at which the wireless communication terminal waits to start the backoff procedure. At this time, the predetermined time may be the AIFS described above. For convenience of description, a separate EDCA parameter set used by a wireless communication terminal scheduled for UL MU transmission is referred to as an MU EDCA parameter set.

Figure 7:
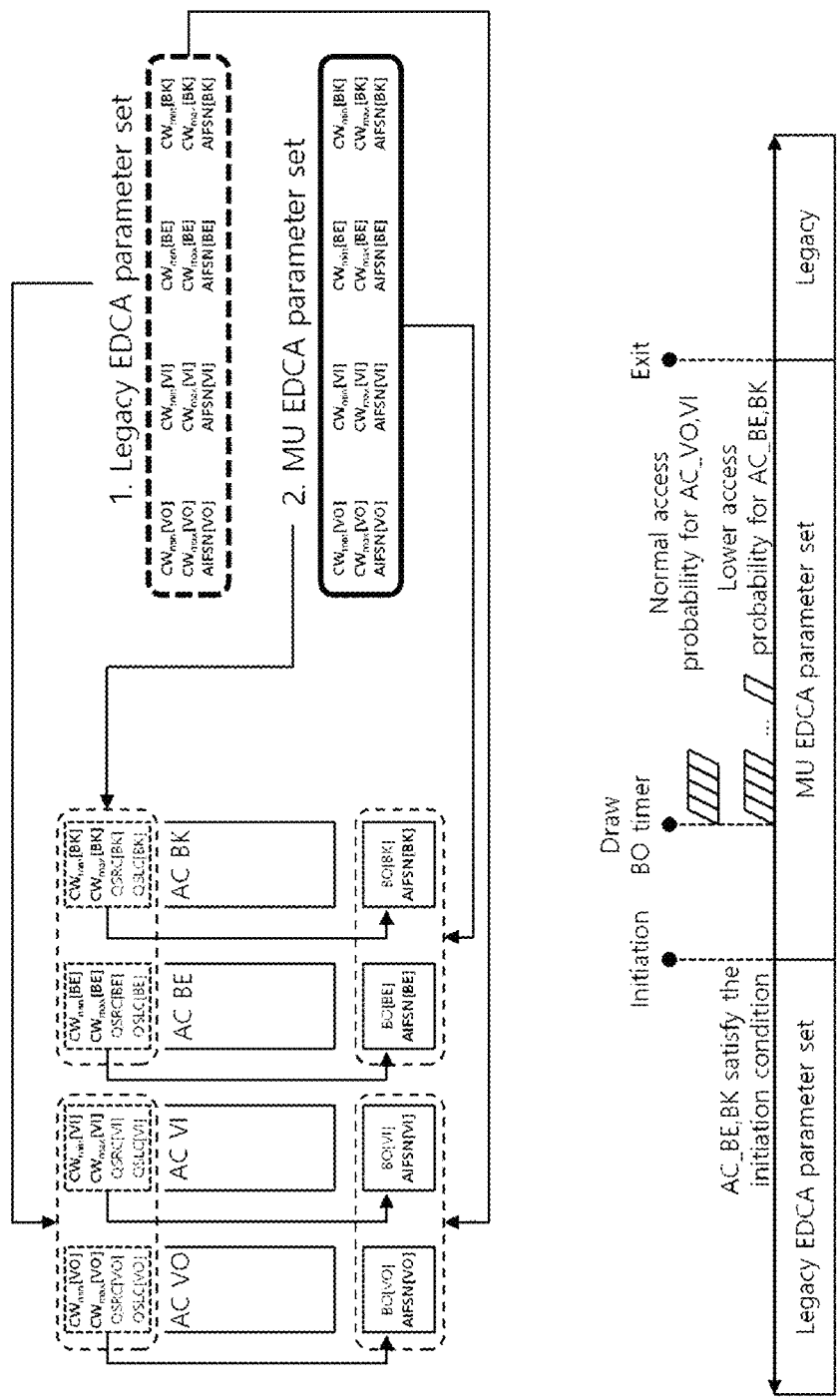
FIG. 7 shows a method of applying an MU EDCA parameter set by a wireless communication terminal according to an embodiment of the present invention.

As in the embodiment of FIG. 7, the wireless communication terminal to which the MU EDCA parameter set is applied accesses the channel when the channel to be accessed is idle for a longer AIFS period than the general AIFS period waiting for transmission of the corresponding data. When the corresponding channel is idle during the AIFS corresponding to the MU EDCA parameter set, the wireless communication terminal starts a backoff procedure for the corresponding channel.

The base wireless communication terminal may transmit information on the MU EDCA parameter set to the wireless communication terminals scheduled for UL MU transmission. Specifically, the base wireless communication terminal may transmit an MU EDCA parameter element including information on the MU EDCA parameter set to a wireless communication terminal scheduled for UL MU transmission. At this time, the base wireless communication terminal may transmit the MU EDCA parameter element using the beacon frame. A concrete method of switching the EDCA parameter set will be described in detail with reference to FIG. 7 to FIG. 11.

FIG. 7 shows a method of applying an MU EDCA parameter set by a wireless communication terminal according to an embodiment of the present invention.

The wireless communication terminal may determine whether to apply the MU EDCA parameter set by each AC. Specifically, the wireless communication terminal may determine whether to apply the MU EDCA parameter set by each AC based on UL MU transmission. In a specific embodiment, the wireless communication terminal may apply the MU EDCA parameter set to data transmission corresponding to the AC scheduled for UL MU transmission. This is because if the MU EDCA parameter set is applied to an AC that does not correspond to the UL MU transmission target, the channel access fairness may be degraded.

In the embodiment of FIG. 7, the wireless communication terminal applies the MU EDCA parameter set. At this time, the wireless communication terminal applies the MU EDCA parameter set to some AC (e.g., BE and BK) indicated by the MU EDCA parameter set. Therefore, in order for AC to transmit traffic corresponding to BE and BK, the wireless communication terminal uses the MU EDCA parameter set to access the channel. At this time, the probability that the wireless communication terminal may start transmission within a predetermined time is lower than when a general EDCA parameter set is used.

When the wireless communication terminal determines whether to apply the MU EDCA parameter set for each AC, the wireless communication terminal may guide the AC to which the MU EDCA parameter set is applied to a specific AC to degrade the fairness with other terminals. For example, the wireless communication terminal may induce only the data of the AC having a relatively large backoff timer value to be scheduled for the UL MU transmission. Therefore, the wireless communication terminal may determine whether to apply the MU EDCA parameter set based on the current channel access wait state. Specifically, when the wireless communication terminal applies the MU EDCA parameter set, the wireless communication terminal may be regulated to mandatorily apply the MU EDCA parameter set to the primary AC with the shortest channel access wait time. At this time, the channel access wait time may be determined based on the value of the remaining backoff timer and the AIFS value. Specifically, the channel access wait time may be the sum of the time corresponding to the backoff timer and the AIFS. When there are a plurality of wireless communication terminals having a minimum channel access wait time, the wireless communication terminal may restrict the EDCA parameter set application condition to mandatorily apply the MU EDCA parameter set to a plurality of ACs.

Figure 8:
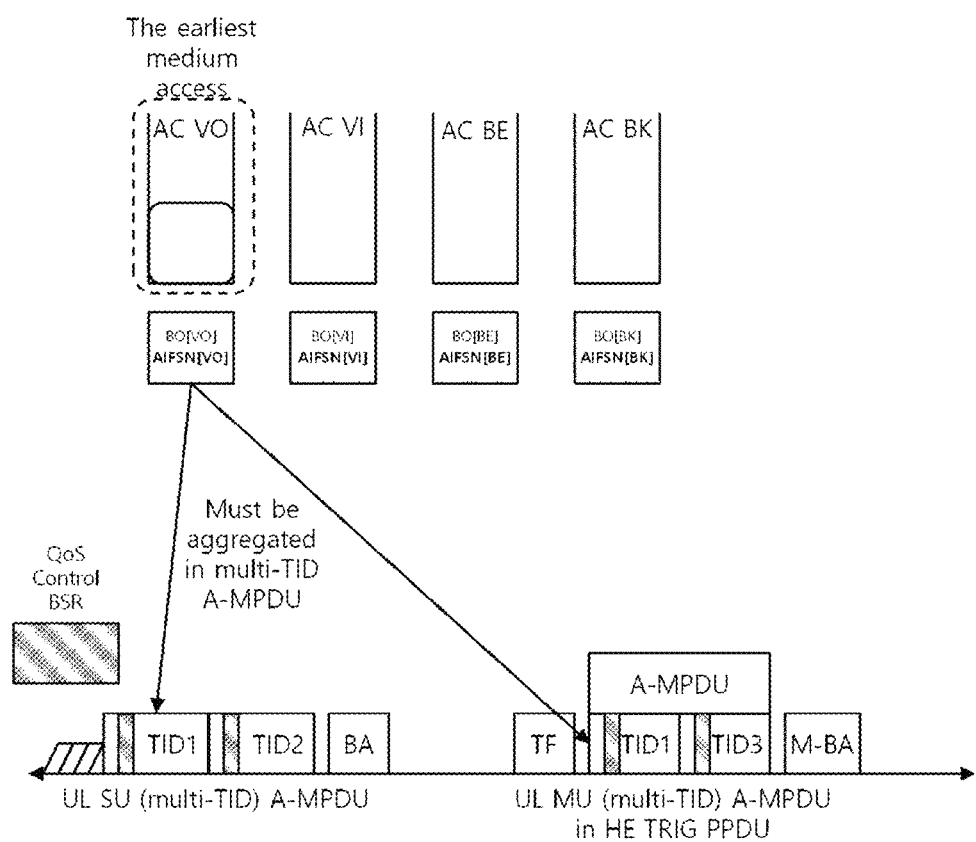
FIG. 8 shows a method of aggregating multi-TID A-MPDUs by a wireless communication terminal according to an embodiment of the present invention.

FIG. 8 shows a method of aggregating multi-TID A-MPDUs by a wireless communication terminal according to an embodiment of the present invention.

The wireless communication terminal may aggregate a plurality of MPDUs corresponding to each of a plurality of TIDs and generate an Aggregate-MAC Protocol Data Unit (A-MPDU). At this time, the A-MPDU may be referred to as a multi-TID A-MPDU. At this time, when the wireless communication terminal intentionally inserts the MPDU of the TID corresponding to the AC having the largest channel access wait time into the multi-TID A-MPDU, the transmission fairness between the wireless communication terminals may be lowered. Therefore, the wireless communication terminal may be restricted to transmit the multi-TID A-MPDU including the MPDU of the TID corresponding to the AC having the smallest channel access wait time. At this time, the size of the MPDU of the TID corresponding to the AC having the smallest channel access wait time included in the multi-TID A-MPDU may be larger than a predetermined size. In addition, when the wireless communication terminal performs the UL MU transmission, the wireless communication terminal may be restricted to transmit the multi-TID A-MPDU, including the TID indicated by the base wireless communication terminal.

The AC having the smallest channel access wait time in the wireless communication terminal of FIG. 8 is VO. The wireless communication terminal generates the multi-TID A-MDPU, including the MPDU of the TID TID1 corresponding to the VO. The wireless communication terminal transmits the generated multi-TID A-MPDU to the base wireless communication terminal. At this time, the wireless communication terminal may transmit a buffer status report (BSR) through the QoS control field of the MPDU included in the multi-TID A-MPDU. This will be described in more detail with reference to FIG. 10. The wireless communication terminal may maintain channel access fairness with other wireless communication terminals through these embodiments.

As described above, the base wireless communication terminal may transmit information on the MU EDCA parameter set to the wireless communication terminal. This will be described with reference to FIGS. 9 to 11.

Figure 9:
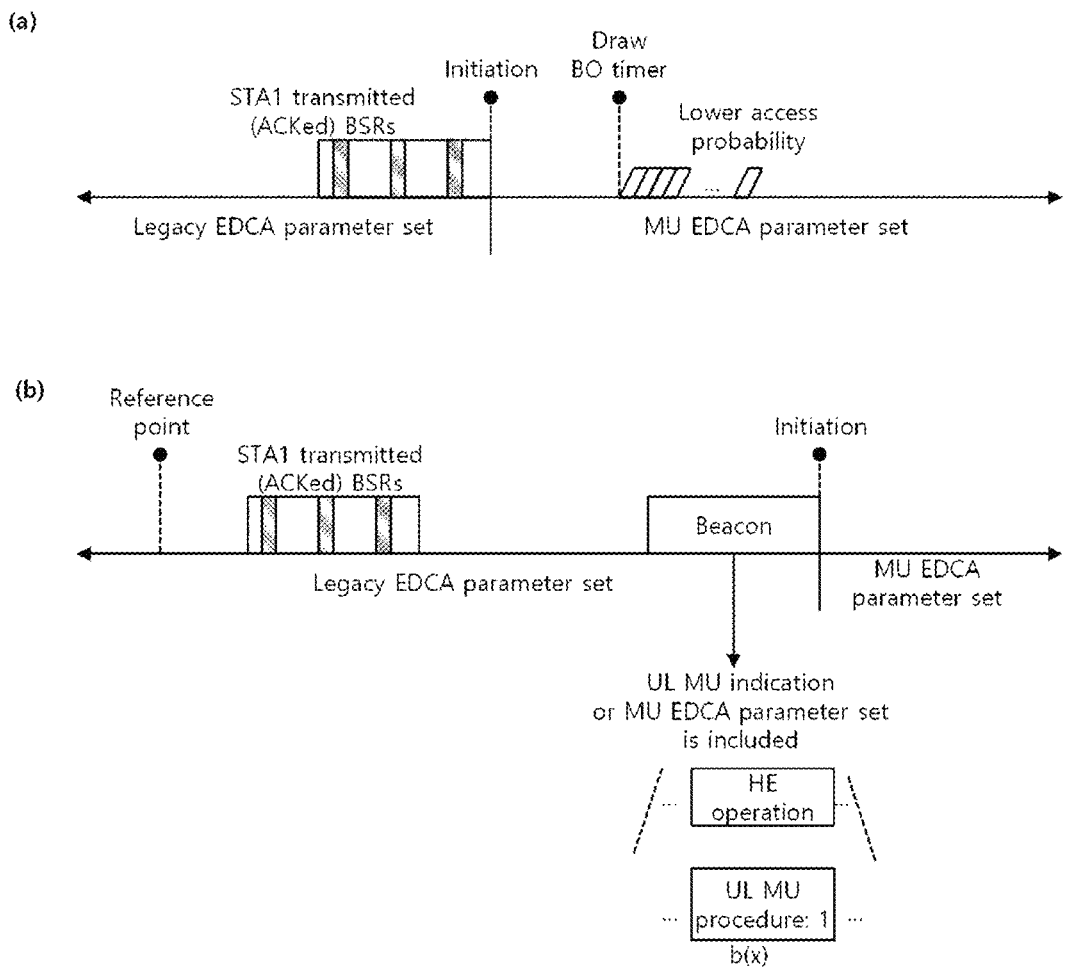
FIG. 9 shows an operation in which a wireless communication terminal according to an embodiment of the present invention receives information on an MU EDCA parameter set from a base wireless communication terminal and applies the information on an MU EDCA parameter set.

FIG. 9 shows an operation in which a wireless communication terminal according to an embodiment of the present invention receives information on an MU EDCA parameter set from a base wireless communication terminal and applies the information on an MU EDCA parameter set.

When the wireless communication terminal transmits the BSR, the wireless communication terminal may apply the MU EDCA parameter set. Specifically, when the wireless communication terminal transmits the BSR, the wireless communication terminal may apply the MU EDCA parameter set to the AC related to the BSR transmission. The AC related to the BSR transmission may be an AC with a buffer state reported through the BSR. In addition, when the wireless communication terminal transmits the BSR, the wireless communication terminal may apply the MU EDCA parameter set to all ACs. This is because the base wireless communication terminal may schedule UL MU transmission based on the BSR transmitted by the wireless communication terminal. Specifically, the wireless communication terminal may access the channel by applying the MU EDCA parameter set from when the transmission of the BSR is completed, as in the embodiment of FIG. 9(a). The wireless communication terminal may transmit the BSR to the base wireless communication terminal using various methods. This will be described with reference to FIG. 10.

Figure 10:
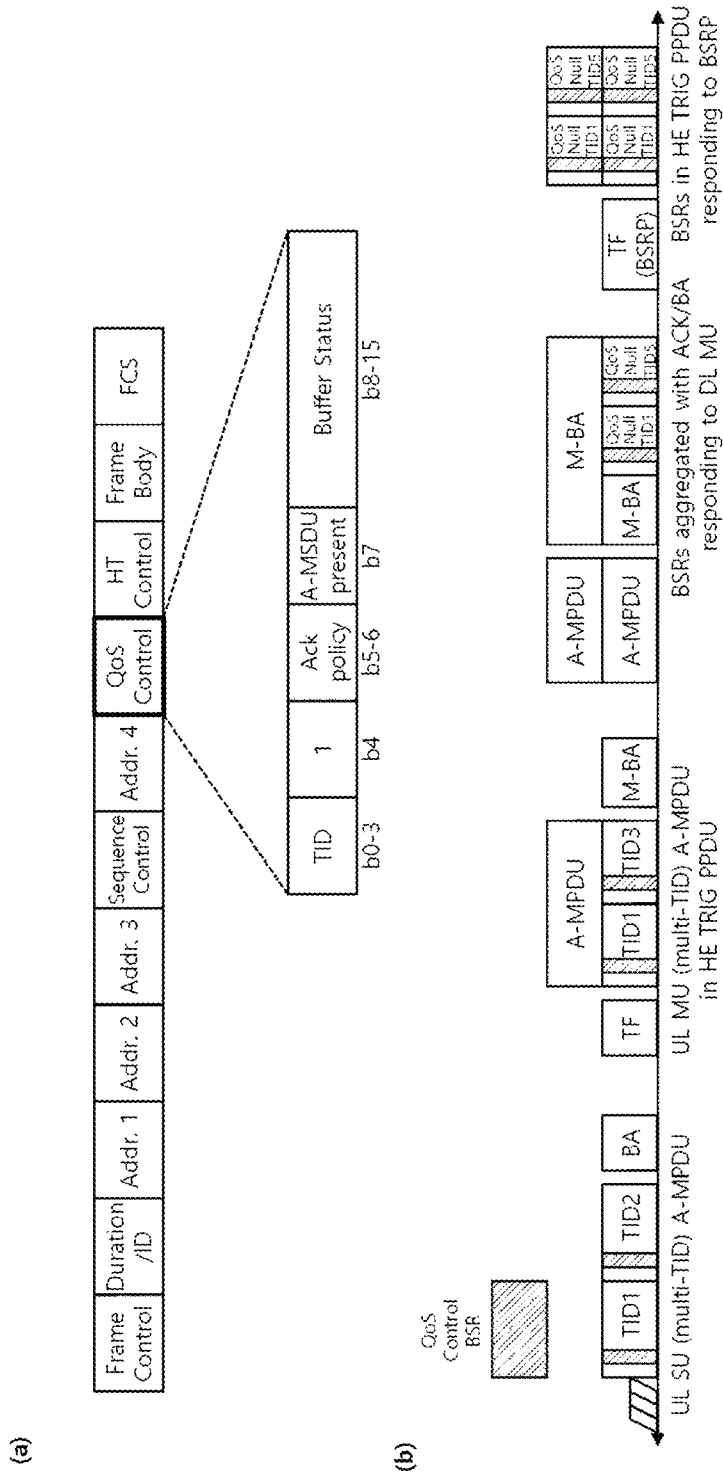
FIG. 10 describes an operation in which a base wireless communication terminal according to an embodiment of the present invention transmits a BSR through a QoS Control field.

FIG. 10 describes an operation in which a base wireless communication terminal according to an embodiment of the present invention transmits a BSR through a QoS Control field.

The wireless communication terminal may transmit the BSR using the QoS control field of the MAC header. In addition, the format of the BA control field may be the same as that of the embodiment of FIG. 10(a). Specifically, the wireless communication terminal may transmit the BSR using the QoS control field of the MPDU while transmitting the MPDU including the QoS data. In addition, the wireless communication terminal may transmit the BSR using the QoS control field of the MPDU while transmitting the QoS null MPDU that does not include data. Also, the wireless communication terminal may insert a QoS Null MPDU into the A-MPDU regardless of the TID number limitation that the multi-TID A-MPDU may include.

In the uplink single user (UL SU) transmission as in the embodiment of FIG. 10(b), the wireless communication terminal may transmit the BSR using the QoS control field. Further, in the UL MU transmission triggered by the trigger frame, the wireless communication terminal may transmit the BSR using the QoS control field. In addition, the wireless communication terminal receives the A-MPDU from the base wireless communication terminal, and the wireless communication terminal may transmit the BSR using the QoS control field while transmitting the BA frame for the A-MPDU. In addition, the wireless communication terminal may receive the BSRP, which is a trigger frame for triggering the BSR transmission, and the wireless communication terminal may transmit the BSR using the QoS control field of the QoS Null MPDU.

Again, FIG. 9 is described. In another specific embodiment, the wireless communication terminal may apply the MU EDCA parameter set when receiving the information on UL MU scheduling from the base wireless communication terminal. At this time, the information on the UL MU scheduling may be information indicating that the UL MU transmission is scheduled. In addition, the base wireless communication terminal may transmit information on UL MU transmission scheduling to the wireless communication terminal using at least one of a beacon frame and an action frame. The wireless communication terminal may obtain information on UL MU transmission scheduling from at least one of a beacon frame and an action frame. In this case, the Action frame may be an Action no ACK frame not requiring an ACK frame for the Action frame. Specifically, the wireless communication terminal receives information on the UL MU scheduling from the base wireless communication terminal, and applies the MU EDCA parameter set to the AC indicated by the UL MU scheduling information. In addition, the wireless communication terminal may apply the MU EDCA parameter set to the AC having the history of transmitting the BSR within a predetermined period from when receiving the information on the UL MU scheduling. Information on the UL MU scheduling may be included in the reserved bits of the HE operation element. Also, if the beacon frame includes an MU EDCA parameter set, the beacon frame implicitly indicates that the UL MU transmission is scheduled. In addition, a field indicating the MU EDCA parameter set may include a field indicating that the UL MU transmission is scheduled. In the embodiment of FIG. 9(b), the wireless communication terminal receives a beacon frame. The wireless communication terminal obtains information on UL MU scheduling from the beacon frame. At this time, the wireless communication terminal applies the MU EDCA parameter set to the AC for which the BSR is transmitted within a period from the reference point to the time when the UL MU scheduling information is received.

In another specific embodiment, the base wireless communication terminal may transmit specific UL MU transmission scheduling information in addition to whether UL MU transmission is scheduled. This will be described with reference to FIG. 11.

Figure 11:
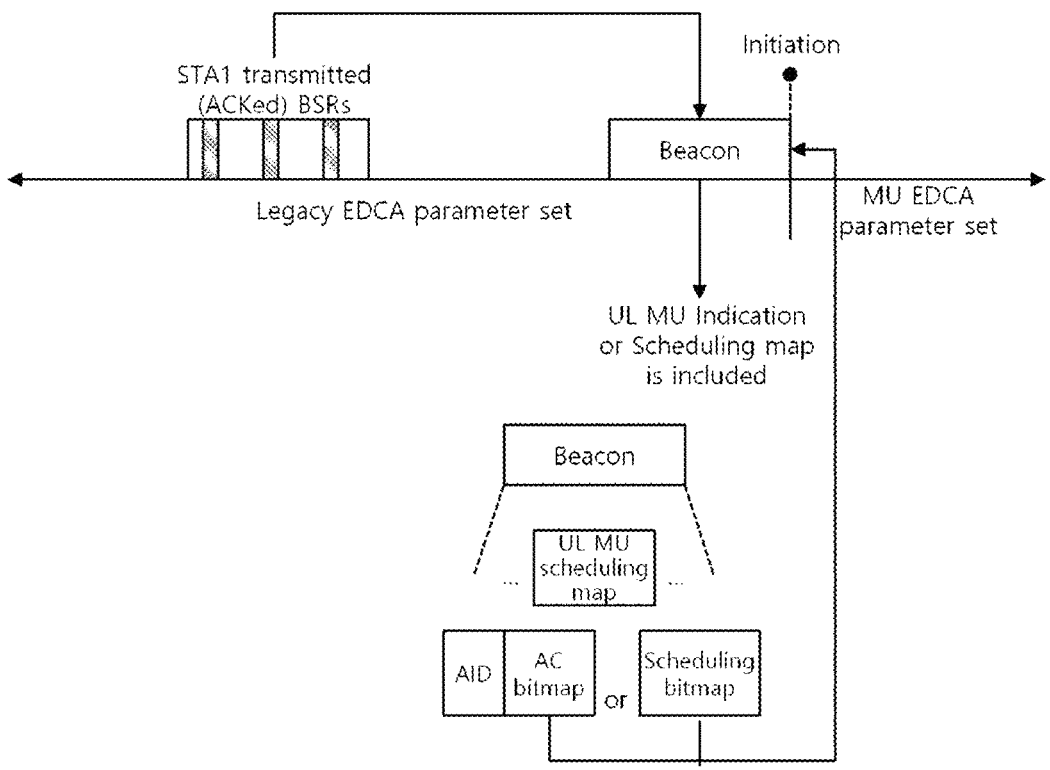
FIG. 11 shows an operation in which a wireless communication terminal according to another embodiment of the present invention receives information on an MU EDCA parameter set from a base wireless communication terminal and applies the information on an MU EDCA parameter set.

FIG. 11 shows an operation in which a wireless communication terminal according to another embodiment of the present invention receives information on an MU EDCA parameter set from a base wireless communication terminal and applies the information on an MU EDCA parameter set.

The base wireless communication terminal may transmit information for identifying the wireless communication terminal for which the UL MU transmission is scheduled. The wireless communication terminal may receive information for identifying the wireless communication terminal scheduled for the UL MU transmission and apply the MU EDCA parameter set based on the information for identifying the wireless communication terminal for which the UL MU transmission is scheduled. Specifically, the base wireless communication terminal may periodically transmit information for identifying a wireless communication terminal scheduled for the UL MU transmission for a predetermined period. At this time, the base wireless communication terminal may transmit information for identifying a wireless communication terminal scheduled for UL MU transmission for a predetermined period using a beacon frame. Also, the base wireless communication terminal may transmit information for identifying a wireless communication terminal scheduled for UL MU transmission using the TIM element of the beacon frame. In another specific embodiment, the base wireless communication terminal may transmit information for identifying the wireless communication terminal scheduled for the UL MU transmission using an element indicating information related to UL MU scheduling. In addition, the base wireless communication terminal may transmit not only the information for identifying the wireless communication terminal scheduled for the UL MU transmission, but also the information for indicating the AC of the UL MU transmission scheduled data. At this time, the information indicating the AC of the UL MU transmission scheduled data may indicate all ACs in some cases. In addition, the base wireless communication terminal may transmit not only the information for identifying the wireless communication terminal scheduled for the UL MU transmission, but also information indicating the time point at which the UL MU transmission is triggered. At this time, the time point at which the UL MU transmission is triggered may indicate the time point at which the trigger information is transmitted. Specifically, the trigger information may include a trigger frame. In addition, the base wireless communication terminal may transmit the backoff timer value of the backoff procedure for transmitting the trigger information.

In the embodiment of FIG. 11, the first station STA1 transmits a BSR to an access point AP. The access point AP receives the BSR and schedules the uplink transmission of the first station STA1 based on the received BSR. The access point AP transmits information on the scheduled UL MU transmission using a beacon frame. At this time, the information on the scheduled UL MU transmission may include information for identifying the wireless communication terminal scheduled for the UL MU transmission. At this time, the information on the scheduled UL MU transmission may be a bit map indicating whether the Association ID (AID) or the wireless communication terminal corresponding to the AID is scheduled for the UL MU transmission. The first station STA1 receives the beacon frame from the access point AP and obtains information on the scheduled UL MU transmission from the beacon frame. When the information on the scheduled UL MU transmission indicates that the first station STA1 is scheduled for UL MU transmission, the first station STA1 applies the MU EDCA parameter set.

Figure 12:
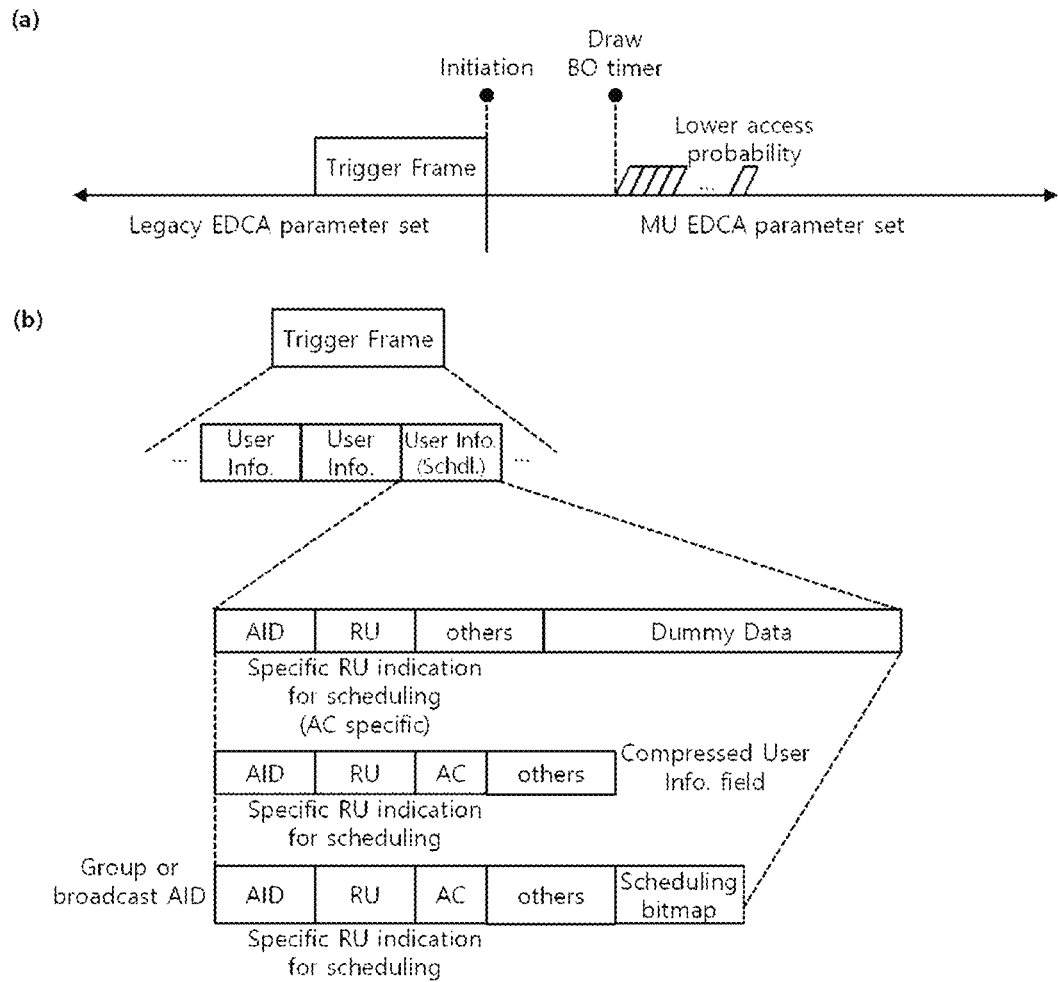
FIG. 12 shows an operation in which a wireless communication terminal according to another embodiment of the present invention obtains information on an MU EDCA parameter set from a trigger frame and applies the information on an MU EDCA parameter set.

FIG. 12 shows an operation in which a wireless communication terminal according to another embodiment of the present invention obtains information on an MU EDCA parameter set from a trigger frame and applies the information on an MU EDCA parameter set.

The wireless communication terminal may apply the MU EDCA parameter set based on whether the trigger information received by the wireless communication terminal triggers the multi-user uplink transmission of the wireless communication terminal. Specifically, based on whether the User Info field of the trigger frame received by the wireless communication terminal indicates the wireless communication terminal, the wireless communication terminal may apply the MU EDCA parameter set. In a specific embodiment, the wireless communication terminal may apply the MU EDCA parameter set when receiving the trigger frame. In this embodiment, in order for the wireless communication terminal to apply the MU EDCA parameter, the base wireless communication terminal does not transmit any additional information. However, the base wireless communication terminal attempts channel access for transmitting the trigger frame, and the wireless communication terminal scheduled for UL MU transmission at this time may also attempt channel access using the existing EDCA parameter set.

Therefore, the base wireless communication terminal may transmit information on the wireless communication terminal triggered after transmitting trigger information using trigger information. Specifically, the base wireless communication terminal may transmit information on a wireless communication terminal to be triggered after a trigger frame is transmitted using the User Info field of the trigger frame. In a specific embodiment, when the field indicating the resource unit (RU) allocation information included in the User Info field indicates a predetermined value, the User Info field may indicate that the wireless communication terminal indicated by the corresponding User Info field is to be triggered after the trigger frame is transmitted. At this time, when the RU assignment information indicated by the User Info field is a predetermined value, the wireless communication terminal may apply the MU EDCA parameter set indicated by the corresponding User Info field. In another specific embodiment, if the value of the field indicating the RU allocation information included in the User Info field is a predetermined value, the field indicating the RU allocation information may indicate an AC to which the MU EDCA parameter set is applied.

In these embodiments, the wireless communication terminal indicated by the User Info field may ignore the remaining fields except the field indicating the RU allocation information and the field indicating the wireless communication terminal indicated by the User Info field in the User Info field. In addition, the size of the User Info field indicating the information on the wireless communication terminal to be triggered after the transmission of the trigger frame may be smaller than the size of the general User Info field. Specifically, the base wireless communication terminal may transmit the User Info field while omitting at least one of the fields indicating the RU allocation information of the User Info field and the fields other than the field indicating the wireless communication terminal indicated by the User Info field. A User Info field indicating information on a wireless communication terminal to be triggered after the transmission of the trigger frame may indicate information on a plurality of wireless communication terminals to be triggered after the transmission of the trigger frame. At this time, the User Info field may include a group AID. In another specific embodiment, the User Info field may include a broadcast AID.

In the embodiment of FIG. 12(a), the base wireless communication terminal transmits a trigger frame to the wireless communication terminal. The wireless communication terminal indicated by the trigger frame applies the MU EDCA parameter set. At this time, the trigger frame may include information on the wireless communication terminal to be triggered after the trigger frame is transmitted as described above. Specifically, the format of the trigger frame may be the same as that shown in FIG. 12(b).

The base wireless communication terminal transmits a target wake time (TWT) element to signal to the wireless communication terminal a time at which the wireless communication terminal should wake up. Specifically, the base wireless communication terminal may transmit a TWT element using a beacon frame. When the base wireless communication terminal attempts channel access to transmit a trigger frame in a service period indicated by a TWT element, a wireless communication terminal triggered by the trigger frame may attempt channel access for uplink transmission. In this situation, the channel access attempt of the wireless communication terminal may lower the chance of the channel access success of the base wireless communication terminal. Therefore, the wireless communication terminal may apply the MU EDCA parameter set based on the TWT element. This will be described in more detail with reference to FIG. 13.

Figure 13:
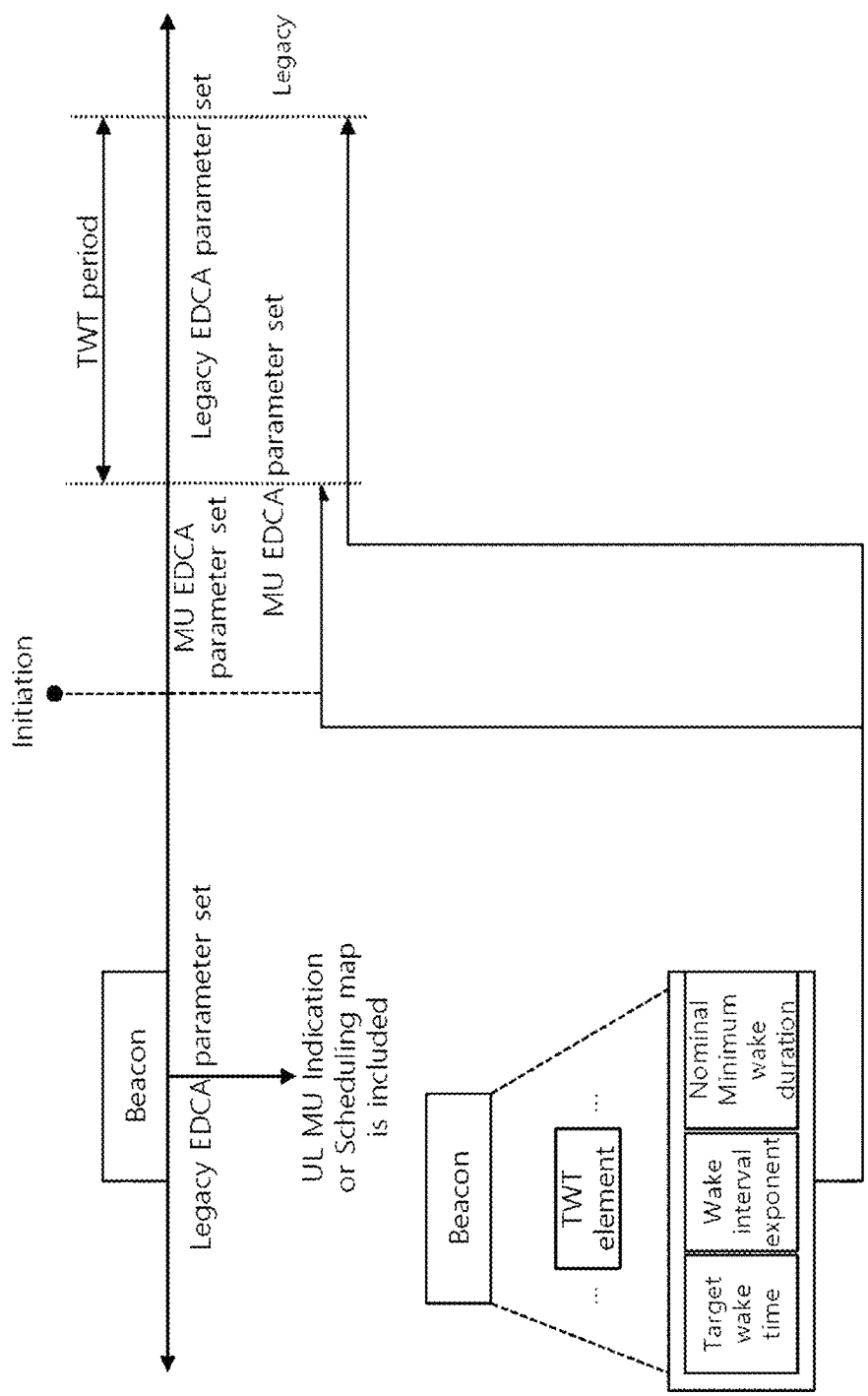
FIG. 13 shows an operation in which a wireless communication terminal according to another embodiment of the present invention obtains information on an MU EDCA parameter set from a target wake time element and applies the information on an MU EDCA parameter set.

FIG. 13 shows an operation in which a wireless communication terminal according to another embodiment of the present invention obtains information on an MU EDCA parameter set from a target wake time element and applies the information on an MU EDCA parameter set.

The wireless communication terminal may apply the MU EDCA parameter set based on the TWT element. Specifically, the wireless communication terminal may apply the MU EDCA parameter set based on the service period indicated by the TWT element. At this time, the service period represents a period that the wireless communication terminal previously agrees to exchange frames with the base wireless communication terminal. In a specific embodiment, the wireless communication terminal may apply the MU EDCA parameter set from a time preceding by a predetermined time from the start time point of the service period indicated by the TWT element. At this time, the predetermined time may be signaled by the base wireless communication terminal. Specifically, the predetermined time may be signaled by the base wireless communication terminal through an element of the beacon frame. For example, the predetermined time may be signaled by the base wireless communication terminal through the MU EDCA parameter set element. Specifically, the predetermined time may be signaled by the base wireless communication terminal through an element of the beacon frame.

In addition, the wireless communication terminal may terminate the MU EDCA parameter set application based on the service period indicated by the TWT element. Specifically, the wireless communication terminal may be allowed to terminate the MU EDCA parameter set application when a predetermined time elapses from the service period indicated by the TWT element. In a specific embodiment, the wireless communication terminal may terminate the MU EDCA parameter set application based on the start time point of the service period indicated by the TWT element. For example, the wireless communication terminal may be allowed to terminate the MU EDCA parameter set application when a predetermined time elapses from the start time point of the service period indicated by the TWT element. In another specific embodiment, the communication terminal may terminate the MU EDCA parameter set application based on the end time point of the service period indicated by the TWT element. For example, the wireless communication terminal may terminate the MU EDCA parameter set application at the end time point of the service period indicated by the TWT element.

In the embodiment of FIG. 13, the base wireless communication terminal signals a service period for a TWT operation by transmitting a beacon frame including a TWT element. The wireless communication terminal receiving the beacon frame determines the MU EDCA parameter set start time point and the end time point based on the TWT element. Specifically, the wireless communication terminal receiving the beacon frame determines the MU EDCA parameter set application start time point based on the start time point of the service period indicated by the TWT element. In addition, the wireless communication terminal receiving the beacon frame determines the MU EDCA parameter set application end time point based on the start time point of the service period indicated by the TWT element. In another specific embodiment, the wireless communication terminal receiving the beacon frame determines the MU EDCA parameter set application end time point based on the end time point of the service period indicated by the TWT element.

The MU EDCA parameter is a channel access condition that is more disadvantageous than a typical EDCA parameter set. Therefore, the wireless communication terminal needs to terminate the MU EDCA parameter set application. The wireless communication terminal switches the MU EDCA parameter set to the normal EDCA parameter set when terminating the MU EDCA parameter application. This will be described with reference to FIGS. 14 to 15.

Figure 14:
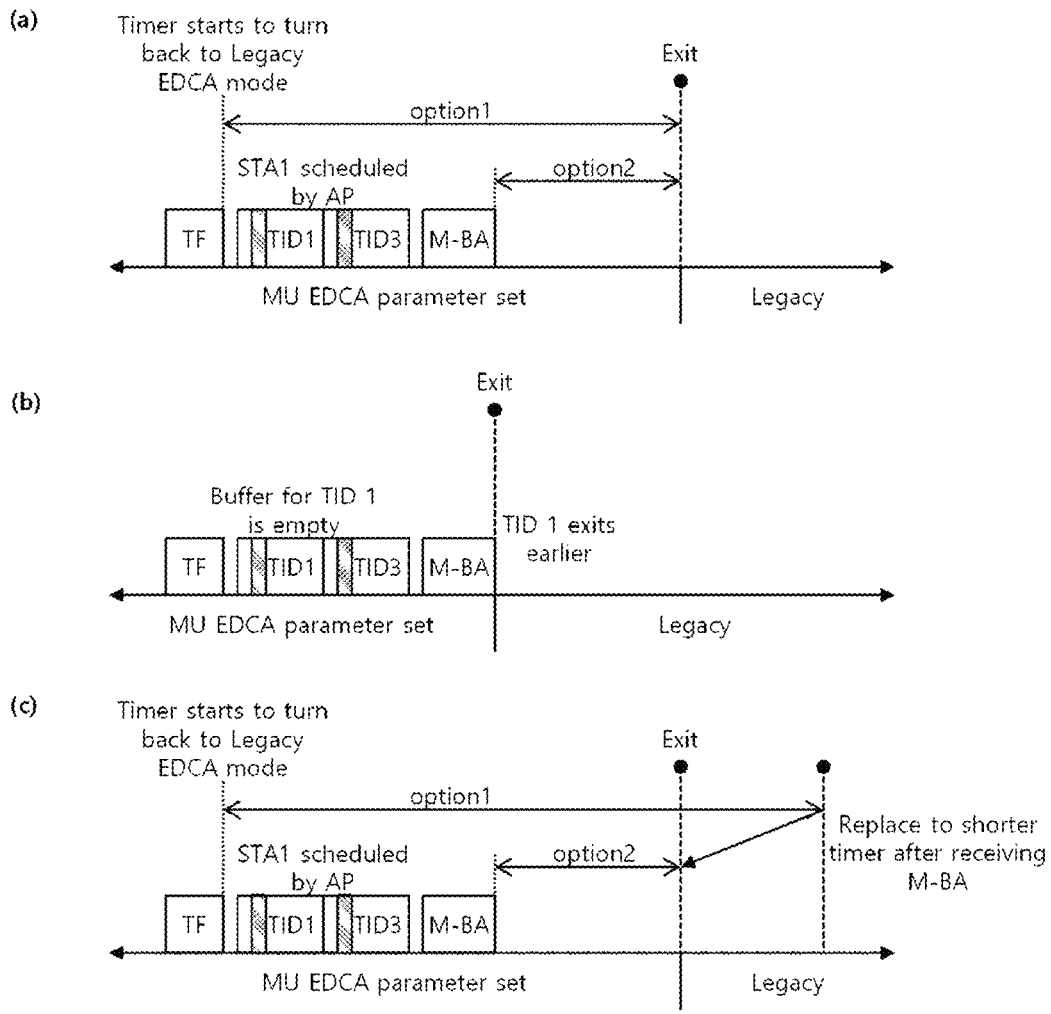
FIG. 14 shows an operation in which a wireless communication terminal according to an embodiment of the present invention terminates the MU EDCA parameter application.

FIG. 14 shows an operation in which a wireless communication terminal according to an embodiment of the present invention terminates the MU EDCA parameter application.

If the MU EDCA parameter set application condition is not satisfied until a certain time elapses from when the timer is set, the wireless communication terminal may set an MU EDCA timer for terminating the MU EDCA parameter set application. Specifically, the wireless communication terminal may set the MU EDCA timer when receiving the trigger information. At this time, when the MU EDCA parameter set application condition is not satisfied for a certain period after setting the MU EDCA timer, the wireless communication terminal may be allowed to terminate the MU EDCA parameter set application. Specifically, if the UL MU transmission of the wireless communication terminal is not scheduled for a certain period from when the MU EDCA timer is set, the wireless communication terminal may be allowed to terminate the MU EDCA parameter set application.

In another embodiment, the wireless communication terminal may set an MU EDCA timer upon receiving a response to the transmission of a trigger-based physical layer protocol data unit (PPDU) of the wireless communication terminal. Specifically, when the wireless communication terminal receives the response to the trigger-based PPDU transmission, the wireless communication terminal may set the MU EDCA timer. This is because if the trigger-based PPDU transmission of the wireless communication terminal fails, the base wireless communication terminal may again attempt the trigger information transmission. In this embodiment, the wireless communication terminal may prepare for a case in which the response to the trigger-based PPDU transmission is not received. Specifically, when the wireless communication terminal does not receive a response to the trigger-based PPDU transmission from the time when the trigger-based PPDU is transmitted until the time point after the predetermined time, the wireless communication terminal may set the MU EDCA parameter set timer. At this time, the predetermined time may be aSIFSTime)+aRxPHYStartDelay+(2×aSlotTime).

In the embodiment of FIG. 14(a), the wireless communication terminal receives the trigger frame TF from the base wireless communication terminal. The wireless communication terminal transmits a trigger-based PPDU including an MPDU corresponding to TID1 and TID3 to the base wireless communication terminal. The wireless communication terminal receives the M-BA frame indicating the ACK for the MPDU included in the trigger-based PPDU from the base wireless communication terminal. In this operation, the wireless communication terminal may set the MU EDCA timer option1 when receiving the trigger frame TF as described above. In addition, the wireless communication terminal may set the MU EDCA timer option2 when receiving the M-BA frame as described above.

In addition, when the wireless communication terminal reports as the BSR that the buffer for the corresponding AC is empty with respect to one or more ACs to the base wireless communication terminal, the wireless communication terminal receives an ACK for transmission of data of the corresponding AC, and terminates the MU EDCA parameter set application. In the embodiment of FIG. 14(b), the wireless communication terminal reports to the base wireless communication terminal that the buffer for TID1 is empty while transmitting the trigger-based PPDU. Therefore, when the wireless communication terminal receives the M-BA frame for the last transmission of the MPDU corresponding to TID1, the wireless communication terminal converts the MU EDCA parameter set into a general EDCA parameter set Legacy. In another embodiment, the wireless communication terminal sets a first MU EDCA timer according to reception of the trigger information, and sets the MU EDCA timer according to the reception of the response to the trigger-based PPDU transmission. At this time, the period of the second timer may be shorter than the period of the first MU timer. Specifically, the wireless communication terminal may set a first MU EDCA timer when receiving the trigger information and set an MU EDCA timer when receiving a response to the trigger-based PPDU transmission. In the embodiment of FIG. 14(c), when the wireless communication terminal receives the trigger frame TF, it sets the first MU EDCA timer option1. Also, the wireless communication terminal sets a second MU EDCA timer option2 that expires earlier than the expiration time set by the first MU EDCA timer option when receiving the M-BA frame.

Further, the wireless communication terminal may set the MU EDCA timer according to the MU EDCA parameter application condition. This will be described in detail with reference to FIG. 15.

Figure 15:
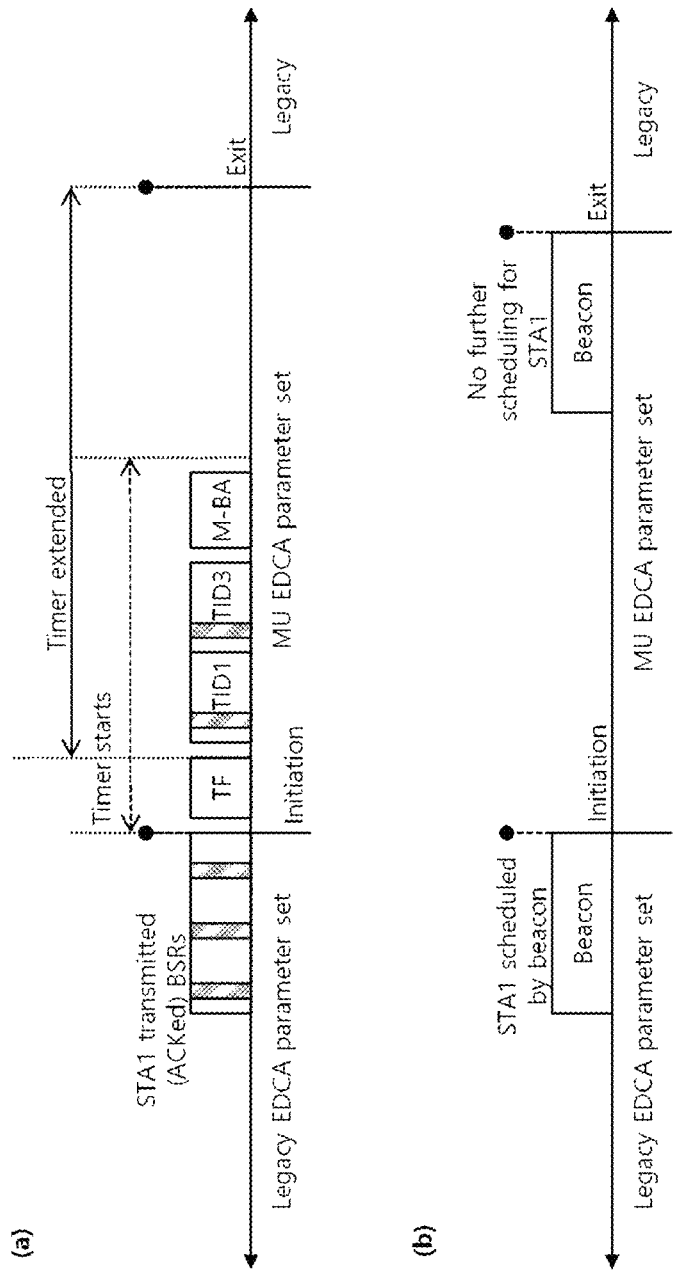
FIG. 15 shows an operation in which a wireless communication terminal according to another embodiment of the present invention terminates the MU EDCA parameter application.

FIG. 15 shows an operation in which a wireless communication terminal according to another embodiment of the present invention terminates the MU EDCA parameter application.

When the wireless communication terminal applies the MU EDCA parameter, the wireless communication terminal may set the MU EDCA timer. Specifically, when the wireless communication terminal transmits the BSR to the base wireless communication terminal, the wireless communication terminal may apply the MU EDCA parameter set and set the MU EDCA timer. At this time, when the trigger frame received by the wireless communication terminal triggers the data transmission of the AC that transmits the BSR, the wireless communication terminal may update the existing MU EDCA timer to the MU EDCA timer that expires later than the expiration time of the existing MU EDCA timer. In the embodiment of FIG. 15(a), the first station STA1 transmits a BSR to an access point AP. At this time, the first station STA1 applies the MU EDCA parameter set and sets the MU EDCA timer. The first station STA1 receives a trigger frame that triggers the traffic transmission for the AC that transmits the BSR from the access point AP. Accordingly, the first station STA1 updates the previously set MU EDCA timer to the MU EDCA timer that expires later than the expiration time of the previously set MU EDCA timer.

In addition, when the wireless communication terminal applies the MU EDCA parameter set based on the UL MU transmission scheduling information included in the beacon frame, the wireless communication terminal may terminate the MU EDCA parameter set application based on the UL MU transmission scheduling information. Specifically, when the beacon frame does not include information on the UL MU transmission scheduling, the wireless communication terminal may be allowed to terminate the MU EDCA parameter set application based on the beacon frame. Also, if the information on the UL MU transmission scheduling included in the beacon frame indicates that the wireless communication terminal is not scheduled for UL MU transmission, the wireless communication terminal may be allowed to terminate the MU EDCA parameter set application based on the UL MU transmission scheduling information. In the embodiment of FIG. 15(b), the first station STA1 receives a beacon frame from an access point AP. The first station STA1 obtains information on UL MU transmission scheduling from the beacon frame. When the information on the UL MU transmission scheduling obtained by the first station STA1 indicates that the UL MU transmission of the wireless communication terminal is scheduled, the first station STA1 applies the MU EDCA parameter set. Thereafter, the first station STA1 receives the beacon frame again from the access point AP. The first station STA1 obtains information on UL MU transmission scheduling from the beacon frame. When the information on the UL MU transmission scheduling obtained by the first station STA1 indicates that the UL MU transmission of the wireless communication terminal is not scheduled, the first station STA1 switches from the MU EDCA parameter set to the general EDCA parameter set.

Figure 16:
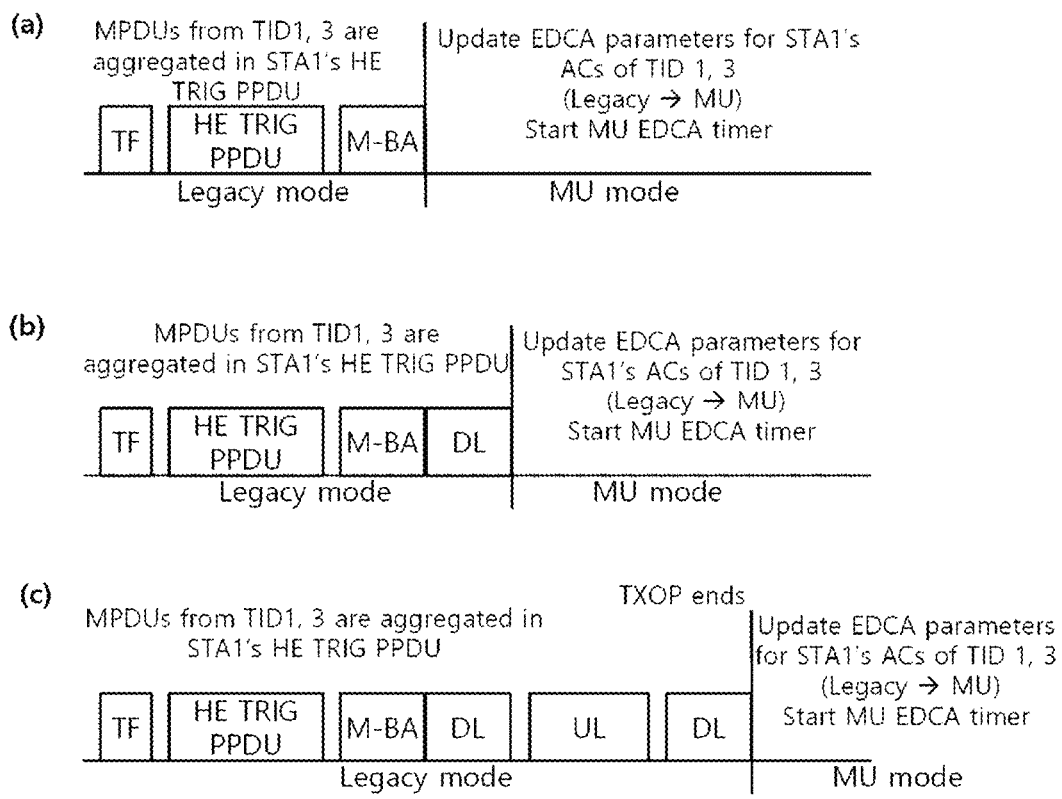
FIG. 16 shows an operation in which a wireless communication terminal according to another embodiment of the present invention applies an MU EDCA parameter.

FIG. 16 shows an operation in which a wireless communication terminal according to another embodiment of the present invention applies an MU EDCA parameter.

As described above, when the wireless communication terminal applies the MU EDCA parameter, the wireless communication terminal may set the MU EDCA timer. In addition, as in the embodiment described with reference to FIG. 14, the wireless communication terminal may set the MU EDCA timer upon receiving the response to the trigger-based PPDU transmission. Therefore, the wireless communication terminal may apply the MU EDCA parameter set upon receiving the response to the trigger-based PPDU transmission. Specifically, when the wireless communication terminal receives the response to the trigger-based PPDU transmission, the wireless communication terminal may apply the MU EDCA parameter set. In a specific embodiment, the wireless communication terminal may apply the MU EDCA parameter set when the following three conditions are satisfied. The first condition is that the wireless communication terminal receives the trigger frame that triggers the transmission of the wireless communication terminal from the base wireless communication terminal. Specifically, the wireless communication terminal receive the trigger frame indicating the AID of the wireless communication terminal. At this time, the trigger frame may be a basic trigger frame. In a specific embodiment, the first condition may include the case where the User Info field of the trigger frame indicates random access and the wireless communication terminal transmits the trigger-based PPDU through a random access. The second condition is to transmit the trigger-based PPDU including the QoS data frame to the base wireless communication terminal according to the reception of the trigger frame. The third condition is that the wireless communication terminal receives an immediate response to the trigger based PPDU from the base wireless communication terminal. At this time, an immediate response may indicate that the recipient transmits a response to the originator within a predetermined time period during the same transmit opportunity (TXOP). When these three conditions are satisfied, the wireless communication terminal may apply the MU EDCA parameter set to the AC of the QoS data frame included in the trigger-based PPDU transmitted by the wireless communication terminal. In addition, the wireless communication terminal may apply the MU EDCA parameter set at the time point at which the immediate response reception for the trigger-based PPDU from the base wireless communication terminal is completed. For example, the wireless communication terminal may apply the MU EDCA parameter set at the time point at which the M-BA frame reception for the trigger-based PPDU from the base wireless communication terminal is completed. Also, when the conditions described above are satisfied before the MU EDCA timer expires, the wireless communication terminal may update the MU EDCA timer with a period corresponding to the MU EDCA parameter set. When the MU EDCA timer expires, the wireless communication terminal terminates the MU EDCA parameter set application.

In the embodiment of FIG. 16(a), the first station STA1 receives the trigger frame TF from the base wireless communication terminal. At this time, the trigger frame TF indicates the AID of the first station STA1. The first station STA1 transmits a trigger-based PPDU HE TRIG PPDU including an MPDU corresponding to TID1 and TID3 to the base wireless communication terminal. The first station STA1 receives the M-BA frame in response to the trigger-based PPDU HE TRIG PPDU from the base wireless communication terminal. When the first station STA1 completes reception of the M-BA frame, in relation to the first station STA1, the base wireless communication terminal applies the MU EDCA parameter to an AC which the M-BA frame indicates as an ACK. At this time, the first station STA1 sets the MU EDCA timer for an AC which the M-BA frame indicates as an ACK.

Even if a PPDU including an immediate response to a trigger-based PPDU further includes another frame, the wireless communication terminal may apply the MU EDCA parameter set at the time point at which the immediate response reception for the trigger-based PPDU from the base wireless communication terminal is completed. In an embodiment of FIG. 16(b), the base wireless communication terminal transmits another frame DL together while transmitting the M-BA frame for the trigger-based PPDU HE TRIG PPDU to the first station STA1. When the first station STA1 completes the reception of the PPDU including the M-BA frame and another frame DL, the first station STA1 applies the MU EDCA parameter to an AC which the M-BA frame indicates as an ACK. At this time, the first station STA1 sets the MU EDCA timer for AC in which the M-BA frame indicates an ACK.

Also, when the downlink transmission and the uplink transmission are continuously performed in the same TXOP, the wireless communication terminal may apply the MU EDCA parameter set to the end time point of the corresponding TXOP. In an embodiment of FIG. 16(c), the base wireless communication terminal transmits the M-BA frame for the trigger-based PPDU HE TRIG PPDU transmitted by the first station STA1 and another frame DL together as in the embodiment of FIG. 16(b). At this time, the first station STA1 performs uplink transmission to the base wireless communication terminal again. When the first station SAT1 receives a response to the uplink transmission, in relation to the first station STA1, the base wireless communication terminal applies the MU EDCA parameter to an AC in which the M-BA frame indicates an ACK. At this time, the first station STA1 sets the MU EDCA timer for AC which the M-BA frame indicates as an ACK.

In another specific embodiment, under the condition that the wireless communication terminal applies the MU EDCA parameter set, the trigger frame received by the wireless communication terminal may include a trigger frame variant such as a BSR poll frame. In addition, the wireless communication terminal may receive UL MU response scheduling instead of the trigger frame. Specifically, when the wireless communication terminal transmits the QoS data based on the trigger frame variant or the UL MU response scheduling, the wireless communication terminal may apply the MU EDCA parameter set.

In the above-described embodiments, the wireless communication terminal may determine the MU EDCA parameter set application time and the MU EDCA timer setting time in consideration of the type of the responding requested by the MPDU included in the trigger-based PPDU. This will be described with reference to FIGS. 17 to 18.

FIG. 17 shows an A-MPDU generated by a wireless communication terminal according to an embodiment of the present invention and a type of responding for a corresponding A-MPDU.

The wireless communication terminal may aggregate one or more MPDUs of a QoS data frame, an action frame, and a control frame into one PSDU and transmit it to the A-MPDU. The A-MPDU including the QoS data frame may be classified into the context of Data Enabled Immediate Response (DEIR) or Data Enabled No Immediate Response (DENIR) depending on whether QoS data requests an Ack. The wireless communication terminal receiving the A-MPDU may determine whether the QoS data requests an Ack according to the value of the ACK Policy subfield of the QoS Control field of the MAC header. At this time, the value of the ACK Policy subfield is indicated for each TID. In addition, the wireless communication terminal may divide a service class of TID into QoSACK and QoSNoACK. The wireless communication terminal transmitting the A-MPDU does not provide the BA agreement for the TID corresponding to the QoSNoACK service class. In addition, the wireless communication terminal transmitting the A-MPDU sets the value of the ACK Policy subfield of the TID corresponding to the QoSNoACK service class to No ACK.

When the wireless communication terminal aggregates a plurality of MPDUs corresponding to one TID and transmits the A-MPDU, the immediate response context of the corresponding A-MPDU is determined according to whether the A-MPDU includes the MPDU of the TID requesting the ACK. Specifically, when the A-MPDU including only a plurality of MPDUs corresponding to one TID includes the MPDU of the TID requesting the ACK, the immediate response context of the corresponding A-MPDU is DEIR. In addition, when the A-MPDU including only a plurality of MPDUs corresponding to one TID includes the MPDU of the TID not requesting the ACK, the immediate response context of the corresponding A-MPDU is DENIR.

As described above, the wireless communication terminal may aggregate a plurality of MPDUs corresponding to a plurality of TIDs to generate a multi-TID A-MPDU. The immediate response context of the multi-TID A-MPDU may be classified as follows. If the multi-TID A-MPDU includes one or more TIDs requesting an ACK, the immediate response context of the corresponding multi-TID A-MPDU is DEIR. Also, if the multi-TID A-MPDU includes only a TID that does not request an ACK or a frame that does not have a TID, the immediate response context of the corresponding multi-TID A-MPDU is DENIR. In the embodiment of FIG. 17(a), the A-MPDU includes an MPDU with a TID of 1, an MPDU with a TIDR of 2, an MPDU with a TID of 3, and an action frame. An MPDU with a TID of 3 does not request an Ack, but each of an MPDU with a TID of 1, an MPDU with a TID of 2, and an action frame requests an immediate response. Therefore, the immediate response context of the A-MPDU is DEIR. In the embodiment of FIG. 17(b), the A-MPDU includes an MPDU with a TID of 1, an MPDU with a TIDR of 2, an MPDU with a TID of 3, and an action No Ack frame. Each of an MPDU with a TID of 1, an MPDU with a TID of 2, and an action frame requests an immediate response. All of an MPDU with a TID of 1, an MPDU with a TID of 2, an MPDU with a TID of 3, and an action No ACK frame do not request an immediate response. Therefore, the immediate response context of the A-MPDU is DENIR.

In the embodiments described with reference to FIG. 16, the wireless communication terminal applies the MU EDCA parameter and sets the MU EDCA timer, based on the immediate response to the MPDU included in the trigger-based PPDU. As described with reference to FIG. 17, the QoS data frame included in the trigger-based PPDU may not request an Ack. When the QoS data frame included in the trigger-based PPDU does not request Ack, the MU EDCA parameter set application operation and the MU EDCA timer setting operation of the wireless communication terminal will be described with reference to FIG. 18.

Figure 18:
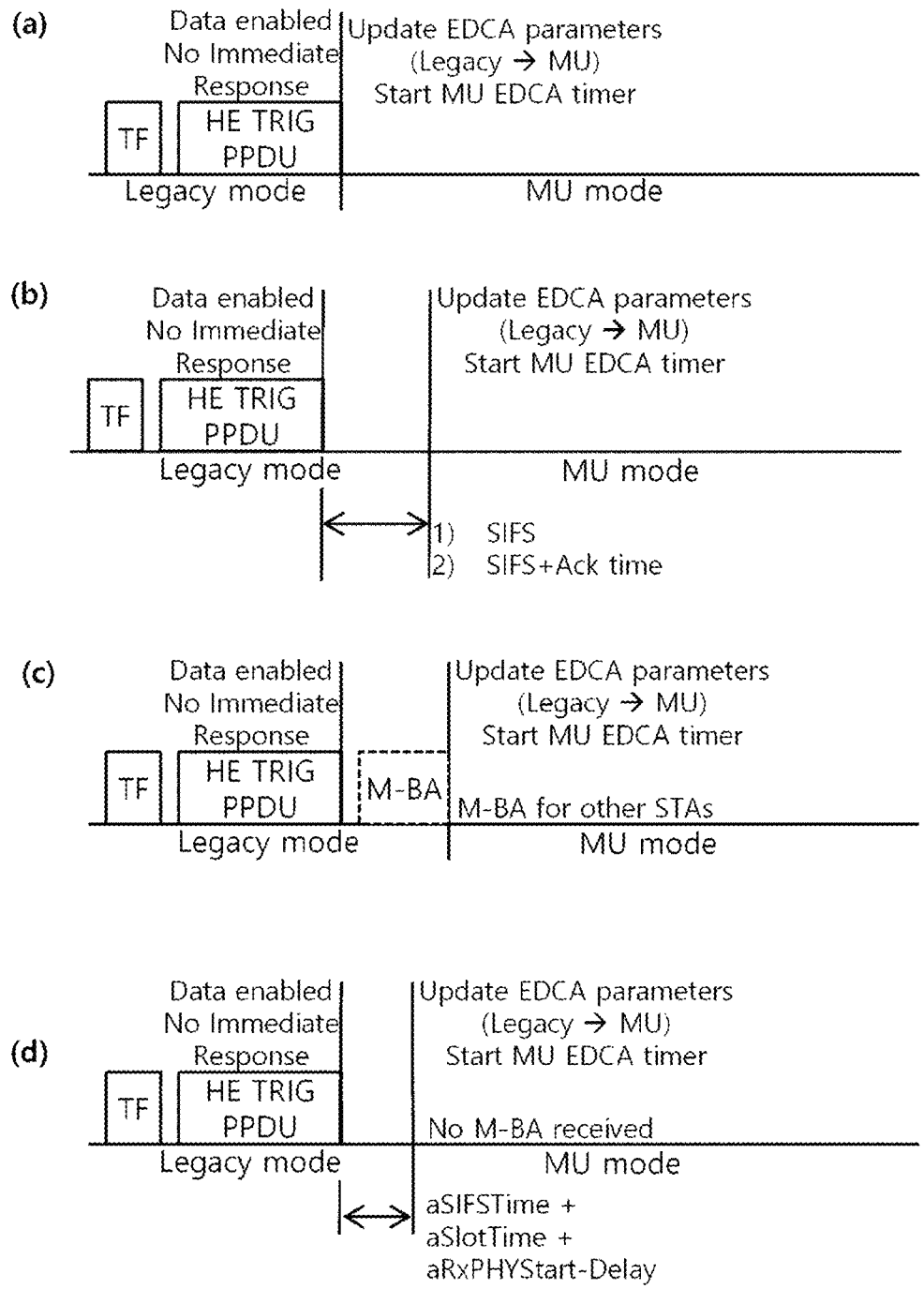
FIG. 18 shows an operation in which a wireless communication terminal according to another embodiment of the present invention applies an MU EDCA parameter.

FIG. 18 shows an operation in which a wireless communication terminal according to another embodiment of the present invention applies an MU EDCA parameter.

When the QoS data frame included in the trigger-based PPDU transmitted by the wireless communication terminal does not request an ACK, the wireless communication terminal may apply the MU EDCA parameter set at the time point at which transmission of the trigger-based PPDU ends. In addition, if the QoS data frame included in the trigger-based PPDU transmitted by the wireless communication terminal does not request an ACK, the wireless communication terminal may set the MU EDCA timer at the time point at which transmission of the trigger-based PPDU ends. As in the embodiment described with reference to FIG. 16, even if the wireless communication terminal receives a trigger frame variant or transmits a trigger-based PPDU based on UL MU response scheduling, the wireless communication terminal may apply the MU EDCA parameter set at the time point at which transmission of the trigger-based PPDU ends. At this time, the wireless communication terminal may set the MU EDCA timer at the time point at which transmission of the trigger-based PPDU ends. In another specific embodiment, when the immediate response context of the A-MPDU included in the trigger-based PPDU transmitted by the wireless communication terminal is DENIR, the wireless communication terminal may apply the MU EDCA parameter set at the time point at which transmission of the trigger-based PPDU ends. In addition, when the immediate response context of the A-MPDU included in the trigger-based PPDU transmitted by the wireless communication terminal is DENIR, the wireless communication terminal may set the MU EDCA timer at the time point at which transmission of the trigger-based PPDU ends. In the embodiment of FIG. 18(*a*), the wireless communication terminal receives the trigger frame TF from the base wireless communication terminal. Upon receiving the trigger frame, the wireless communication terminal transmits a trigger-based PPDU HE TRIG PPDU including an A-MPDU whose immediate response context is DENIR to the base wireless communication terminal. The wireless communication terminal applies the MU EDCA parameter set at the time point at which transmission of the trigger-based PPDU HE TRIG PPDU ends and starts the MU EDCA timer.

In another specific embodiment, when the QoS data frame included in the trigger-based PPDU transmitted by the wireless communication terminal does not request an ACK, the wireless communication terminal may apply the MU EDCA parameter set when a predetermined time elapses after the time point at which transmission of the trigger-based PPDU ends. In addition, when the QoS data frame included in the trigger-based PPDU transmitted by the wireless communication terminal does not request an ACK, the wireless communication terminal may set the MU EDCA timer when a predetermined time elapses after the time point at which transmission of the trigger-based PPDU ends. In another specific embodiment, when the immediate response context of the A-MPDU included in the trigger-based PPDU transmitted by the wireless communication terminal is DENIR, the wireless communication terminal may apply the MU EDCA parameter set when a predetermined time elapses after the time point at which transmission of the trigger-based PPDU ends. In addition, if the immediate response context of the A-MPDU included in the trigger-based PPDU transmitted by the wireless communication terminal is DENIR, the wireless communication terminal may set the MU EDCA timer when a predetermined time elapses after the time point at which transmission of the trigger-based PPDU ends. At this point, the predetermined time may be a short inter frame space (SIFS). In another specific embodiment, the predetermined time may be a time that is the sum of a predetermined representative ACK transmission time and an SIFS. In the embodiment of FIG. 18(*b*), the wireless communication terminal receives the trigger frame TF from the base wireless communication terminal. Upon receiving the trigger frame, the wireless communication terminal transmits a trigger-based PPDU HE TRIG PPDU including an A-MPDU whose immediate response context is DENIR to the base wireless communication terminal. The wireless communication terminal applies the MU EDCA parameter set when a predetermined time elapses after the time point at which transmission of the trigger-based PPDU HE TRIG PPDU ends and starts the MU EDCA timer. At this point, the predetermined time may be an SIFS. In another specific embodiment, the predetermined time may be a time that is the sum of the SIFS and the predetermined representative ACK transmission time Ack time.

In another specific embodiment, if the QoS data frame included in the trigger-based PPDU transmitted by the wireless communication terminal does not request an ACK, the wireless communication terminal may apply the MU EDCA parameter set based on an immediate response to the trigger-based PPDU transmission of another wireless communication terminal that transmits the trigger-based PPDU simultaneously with the wireless communication terminal. In another specific embodiment, when the immediate response context of the A-MPDU included in the trigger-based PPDU transmitted by the wireless communication terminal is DENIR, the wireless communication terminal may apply the MU EDCA parameter set based on an immediate response to the trigger-based PPDU transmission of another wireless communication terminal that transmits the trigger-based PPDU simultaneously with the wireless communication terminal. In these embodiments, when the wireless communication terminal receives an immediate response to the trigger-based PPDU transmission of another wireless communication terminal that transmits the trigger-based PPDU simultaneously with the wireless communication terminal, the wireless communication terminal may apply the MU EDCA parameter set. When the wireless communication terminal does not receive an immediate response to the trigger-based PPDU transmission of another wireless communication terminal that transmits the trigger-based PPDU simultaneously with the wireless communication terminal, the wireless communication terminal may apply the MU EDCA parameter set when a predetermined period elapses from when transmitting the trigger-based PPDU transmitted by the wireless communication terminal. The time when the predetermined period elapses after transmitting the trigger-based PPDU transmitted by the wireless communication terminal may be the time when it elapses by aSIFSTime+aSlotTime+aRxPHYStart-Delay from the time point after PHY-TXEND.confirm primitive.

In addition, if the QoS data frame included in the trigger-based PPDU transmitted by the wireless communication terminal does not request an ACK, the wireless communication terminal may set an MU EDCA timer based on an immediate response to the trigger-based PPDU transmission of another wireless communication terminal that transmits the trigger-based PPDU simultaneously with the wireless communication terminal. In another specific embodiment, when the immediate response context of the A-MPDU included in the trigger-based PPDU transmitted by the wireless communication terminal is DENIR, the wireless communication terminal may set an MU EDCA timer based on an immediate response to the trigger-based PPDU transmission of another wireless communication terminal that transmits the trigger-based PPDU simultaneously with the wireless communication terminal. In these embodiments, when the wireless communication terminal receives an immediate response to the trigger-based PPDU transmission of another wireless communication terminal that transmits the trigger-based PPDU simultaneously with the wireless communication terminal, the wireless communication terminal may set the MU EDCA timer. When the wireless communication terminal does not receive an immediate response to the trigger-based PPDU transmission of another wireless communication terminal that transmits the trigger-based PPDU simultaneously with the wireless communication terminal, the wireless communication terminal may set the MU EDCA timer when a predetermined period elapses from when transmitting the trigger-based PPDU transmitted by the wireless communication terminal. The time when the predetermined period elapses after transmitting the trigger-based PPDU transmitted by the wireless communication terminal may be the time when it elapses by aSIFSTime+aSlotTime+aRxPHYStart-Delay from the time point after PHY-TXEND.confirm primitive.

In the embodiment of FIG. 18(c), the wireless communication terminal receives a trigger frame TF and transmits a trigger-based PPDU HE TRIG PPDU including an A-MPDU whose immediate response context is DENIR to the base wireless communication terminal. When the wireless communication terminal transmits a trigger-based PPDU HE TRIG PPDU, the wireless communication terminal simultaneously detects the M-BA frame transmission for the trigger-based PPDU of another wireless communication terminal that transmits the trigger-based PPDU. The wireless communication terminal applies the MU EDCA parameter set at the time point at which reception of the M-BA frame for the trigger-based PPDU of another wireless communication terminal ends, and starts the MU EDCA timer. When the wireless communication terminal does not receive the M-BA frame for the trigger-based PPDU of another wireless communication terminal as in the embodiment of FIG. 18(d), the wireless communication terminal applies the MU EDCA parameter set at the time point at which it elapses by aSIFSTime+aSlotTime+aRxPHYStart-Delay from when transmitting the trigger-based PPDU HE TRIG PPDU, and starts the MU EDCA timer.

In these embodiments, the wireless communication terminal may apply the MU EDCA parameter set to the AC corresponding to the QoS data frame transmitted through the trigger-based PPDU as in the embodiment described with reference to FIG. 16.

In another specific embodiment, when a wireless communication terminal transmits a trigger-based PPDU, the wireless communication terminal may be restricted not to transmit a QoS data frame that does not request an ACK. Specifically, when the wireless communication terminal transmits the trigger-based PPDU, the wireless communication terminal may be restricted not to transmit the QoS data frame with the Ack policy subfield set to No Ack.

The operation of the wireless communication terminal to apply a separate MU EDCA parameter set will be described with reference to FIGS. 19 to 21.

Figure 19:
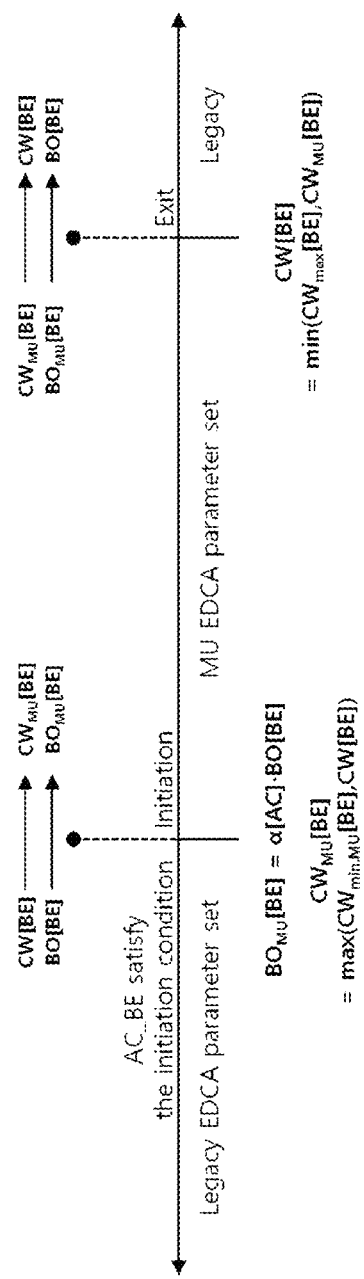
FIG. 19 shows an operation in which a wireless communication terminal according to an embodiment of the present invention applies an MU EDCA parameter set.

FIG. 19 shows an operation in which a wireless communication terminal according to an embodiment of the present invention applies an MU EDCA parameter set.

As described above, the EDCA parameter set may include a backoff timer and a parameter related to CW. When the wireless communication terminal switches the currently used first EDCA parameter set to the second EDCA parameter set, the wireless communication terminal may change the value of the backoff timer currently used in the backoff procedure based on the second EDCA parameter set. At this time, the first EDCA parameter set may be a general EDCA parameter set, and the second EDCA parameter set may be an MU EDCA parameter set. Also, the first EDCA parameter set may be an MU EDCA parameter set and the second EDCA parameter set may be a general EDCA parameter set. This is because if the wireless communication terminal does not change the value of the backoff timer when switching the EDCA parameter set, the effect of changing the channel access priority caused by the switching of the EDCA parameter set may not be immediately applied.

In a specific embodiment, the wireless communication terminal may multiply the backoff timer currently used in the backoff procedure with a value determined based on the second EDCA parameter set. At this time, the value determined based on the second EDCA parameter set may be a value determined based on the CW parameter value of the second EDCA parameter set. Specifically, a value determined based on the second parameter set may be a value obtained by dividing the CWmin of the second EDCA parameter set by the CWmin of the first EDCA parameter set. In another specific embodiment, the value determined based on the second EDCA parameter set may be a value obtained by dividing the CWmax of the second EDCA parameter set by the CWmax of the first EDCA parameter set. In another specific embodiment, when the value of the backoff timer currently used by the wireless communication terminal in the backoff procedure is smaller than the CWmin of the second EDCA parameter set, the wireless communication terminal may set the value of the backoff timer to the CWmin of the second EDCA parameter set. In addition, when the value of the backoff timer currently used by the wireless communication terminal in the backoff procedure is greater than the CWmax of the second EDCA parameter set, the wireless communication terminal may set the value of the backoff timer to the CWmax of the second EDCA parameter set.

When the wireless communication terminal switches the currently used first EDCA parameter set to the second EDCA parameter set, the wireless communication terminal may change the parameter value for CW currently used in the backoff procedure based on the second EDCA parameter set. At this time, the parameter for CW may include CWmin and CWmax. Also, the EDCA parameter set may include a short retry limit and a long retry limit, which are parameters for adjusting the CW value according to the number of channel retransmission attempts. Also, the first EDCA parameter set may be a general EDCA parameter set and the second EDCA parameter set may be an MU EDCA parameter set. Also, the first EDCA parameter set may be an MU EDCA parameter set and the second EDCA parameter set may be a general EDCA parameter set. The wireless communication terminal may increase the value of CW in the backoff procedure. At this time, the value of CW is limited to the value of CWmax, and the wireless communication terminal may reset the value of CW to CWmin according to the retry limit value. This is because the restriction may not be applied when the wireless communication terminal switches the EDCA parameter set.

Specifically, when the CW value currently used by the wireless communication terminal in the backoff procedure is smaller than the CWmin of the second EDCA parameter set, the wireless communication terminal may set the CW value to CWmin of the second EDCA parameter set. In addition, when the CW value currently used by the wireless communication terminal in the backoff procedure is greater than the CWmax of the second EDCA parameter set, the wireless communication terminal may set the CW value to the CWmax of the second EDCA parameter set. In addition, if the QoS short retry counter (QSRC) is greater than the short retry limit or the QoS long retry counter (QLRC) is greater than the short retry limit, the wireless communication terminal may set the CW value to the CWmin of the second EDCA parameter set.

In the embodiment of FIG. 19, the wireless communication terminal switches the legacy EDCA parameter set for the AC BE to the MU EDCA parameter set. At this time, the wireless communication terminal sets the backoff timer value $BO_{MU}[BE]$ to the product of a value a[AC] obtained based on the MU EDCA parameter set and the value of the backoff timer BO[BE] in the current backoff procedure. Also, the wireless communication terminal sets the CW value CWmu[BE] to a larger value of the CW value CW[BE] in the current backoff procedure and CWmin CWmin[BE] in the MU EDCA parameter set. When the wireless communication terminal converts the MU EDCA parameter set into a general EDCA parameter set, the wireless communication terminal sets the CW value CW[BE] to a smaller value of CW CWmu[BE] value in the current backoff procedure and CWmax CWmax[BE] of the Legacy EDCA parameter set.

The specific operation of the wireless communication terminal to set the CW will be further described with reference to FIG. 20 and following drawings.

Figure 20:
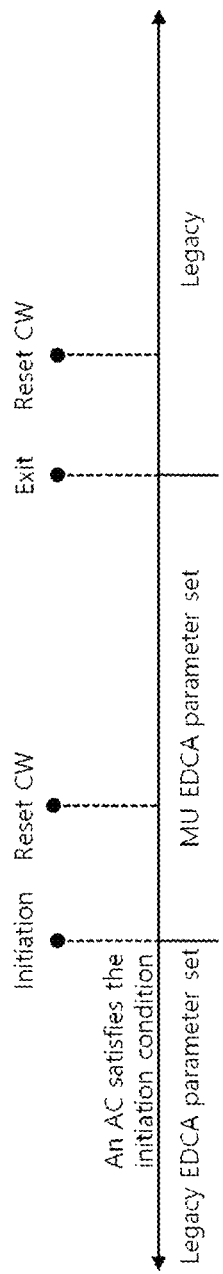
FIG. 20 shows an operation of changing a CW value while a wireless communication terminal according to an embodiment of the present invention changes an EDCA parameter set.

FIG. 20 shows an operation of changing a CW value while a wireless communication terminal according to an embodiment of the present invention changes an EDCA parameter set.

The wireless communication terminal changes the CW value in the following three situations during the backoff procedure.

1) When the transmission of the initial PPDU of the TXOP fails and the AC of the MPDU is the primary AC 2) When two or more EDCAFs contend in the same wireless communication terminal and the transmission attempt of the wireless communication terminal collides with another EDCAF having a higher priority in the wireless communication terminal 3) PHY-TXBUSY.indication (BUSY) primitive is responded with respect to PHYTXSTART.request primitive and when a transmission attempt of a wireless communication terminal coordinated by a multiple MAC-station management entity (MM-SME) collides with a transmission attempt of another wireless communication terminal coordinated by the same MM-SME At this time, the wireless communication terminal changes the CW value according to the following rule.

a) When QSRC QSRC[AC] corresponding to the AC reaches the short retry limit dot11ShortRetryLimit) or QLRC QLRC[AC] corresponding to the AC reaches the long retry limit dot11LongRetryLimit, the wireless communication terminal resets the CW value CW[AC] corresponding to the AC to the CWmin value CWmin [AC].

b) When the value of dot11Robust AVStreamingImplemented is true, and the QoS short drop retry count QSDRC [AC] corresponding to the AC reaches dot11Short DEIRetryLimit, or the QoS long drop retry count QLDRC[AC] for AC reaches dot11LongDEIRetryLimit, the wireless communication terminal resets the CW value CW[AC] corresponding to the AC to the CWmin value CWmin[AC].

c) Otherwise c-1) When the CW value CW[AC] corresponding to the AC is smaller than the CWmax value CWmax[AC] corresponding to the AC, the wireless communication terminal sets the CW value CW[AC] corresponding to the AC to (CW[AC]+1)×2−1.

c-2) When the CW value CW[AC] corresponding to the AC is equal to the CWmax value CWmax[AC] corresponding to the AC, the wireless communication terminal does not change the CW value CW[AC] corresponding to the AC.

The situations of 1), 2) and 3) are all cases where the wireless communication terminal retries transmission due to transmission failure, internal contention failure, and the like. Also, in a) and b), the wireless communication terminal resets the CW value due to exceeding the number of retries. In c), the wireless communication terminal changes the CW value to retry the transmission. In a), b), and c), the wireless communication terminal operates without considering the case where the EDCA parameter set is changed. For example, the CW value corresponding to the AC is equal to CWmin, and the wireless communication terminal may apply the EDCA parameter set having the CWmin larger than the previous EDCA parameter set. At this time, the wireless communication terminal uses a CW value smaller than the CWmin of the new EDCA parameter set. Also, the CW value corresponding to the AC is equal to CWmax, and the wireless communication terminal may apply the EDCA parameter set having CWmax smaller than the previous EDCA parameter set. At this time, the wireless communication terminal uses a CW value greater than the CWmax of the new EDCA parameter set. At this time, since this does not correspond to the conditions c-1) and c-2) described above, the wireless communication terminal may not change the CW value within the range of CWmin and CWmax. Therefore, the operation of the wireless communication terminal in c) may be changed as follows.

c-1) In case of a legacy wireless communication terminal (e.g., non-HE STA)

c-1-1) When the CW value CW[AC] corresponding to the AC is smaller than the CWmax value CWmax[AC] corresponding to the AC, the wireless communication terminal sets the CW value CW[AC] corresponding to the AC to (CW[AC]+1)×2−1.

c-2-2) When the CW value CW[AC] corresponding to the AC is equal to the CWmax value CWmax[AC] corresponding to the AC, the wireless communication terminal does not change the CW value CW[AC] corresponding to the AC.

c-2) In case of a non-legacy wireless communication terminal (e.g., HE STA)

c-2-1) When the CW value CW[AC] corresponding to the AC is smaller than the CWmin value CWmin[AC], the wireless communication terminal sets the CW value CW[AC] corresponding to the AC to the CWmin value CWmin[AC].

c-2-2) When the CW value CW [AC] corresponding to the AC is smaller than the CWmax value CWmax[AC] corresponding to the AC, the wireless communication terminal sets the CW value CW[AC] corresponding to the AC to (CW[AC]+1)×2-1.

c-2-3) When the CW value CW[AC] corresponding to the AC is equal to the CWmax value CWmax[AC] corresponding to the AC, the wireless communication terminal does not change the CW value CW[AC] corresponding to the AC.

c-2-4) When the CW value CW[AC] corresponding to the AC is greater than the CWmax value CWmax[AC], the wireless communication terminal sets the CW value CW[AC] corresponding to the AC to the CWmax value CWmax[AC].

In another embodiment, the wireless communication terminal may operate as follows in the above-mentioned c).

c-1) In case of a legacy wireless communication terminal (e.g., non-HE STA)

c-1-1) When the CW value CW [AC] corresponding to the AC is smaller than the CWmax value CWmax[AC] corresponding to the AC, the wireless communication terminal sets the CW value CW[AC] corresponding to the AC to (CW[AC]+1)×2−1.

c-2-2) When the CW value CW[AC] corresponding to the AC is equal to the CWmax value CWmax[AC] corresponding to the AC, the wireless communication terminal does not change the CW value CW[AC] corresponding to the AC.

c-2) In case of a non-legacy wireless communication terminal (e.g., HE STA)

c-2-1) When the CW value CW[AC] corresponding to the AC is smaller than the CWmax value CWmax[AC] corresponding to the AC, the wireless communication terminal sets the CW value CW[AC] corresponding to the AC to a larger value of (CW[AC]+1)×2-1 and the CWmin value CWmin[AC].

c-2-2) When the CW value CW[AC] corresponding to the AC is equal to or greater than the CWmax value CWmax [AC] corresponding to the AC, the wireless communication terminal sets the CW value CW[AC] corresponding to the AC to the CWmax value CWmax[AC].

In another embodiment, the wireless communication terminal may operate as follows in the above-mentioned c).

c-1) In case of a legacy wireless communication terminal (e.g., non-HE STA)

c-1-1) When the CW value CW[AC] corresponding to the AC is smaller than the CWmax value CWmax[AC] corresponding to the AC, the wireless communication terminal sets the CW value CW[AC] corresponding to the AC to (CW[AC]+1)×2-1.

c-2-2) When the CW value CW[AC] corresponding to the AC is equal to the CWmax value CWmax[AC] corresponding to the AC, the wireless communication terminal does not change the CW value CW[AC] corresponding to the AC.

c-2) In case of a non-legacy wireless communication terminal (HE STA)

c-2-1) When the CW value CW[AC] corresponding to the AC is smaller than the CWmax value CWmax[AC] corresponding to the AC, the wireless communication terminal sets the CW value CW[AC] corresponding to the AC to a larger value of CW[AC]+1)×2-1 and the CWmin value CWmin[AC].

c-2-2) If the CW value CW[AC] corresponding to the AC is equal to the CWmax value CWmax[AC] corresponding to the AC, the wireless communication terminal does not change the CW value CW[AC] corresponding to the AC.

c-2-3) If the CW value CW[AC] corresponding to the AC is greater than the CWmax value CWmax[AC] corresponding to the AC, the wireless communication terminal sets the CW value CW[AC] corresponding to the AC to the CWmax value CWmax [AC].

Figure 21:
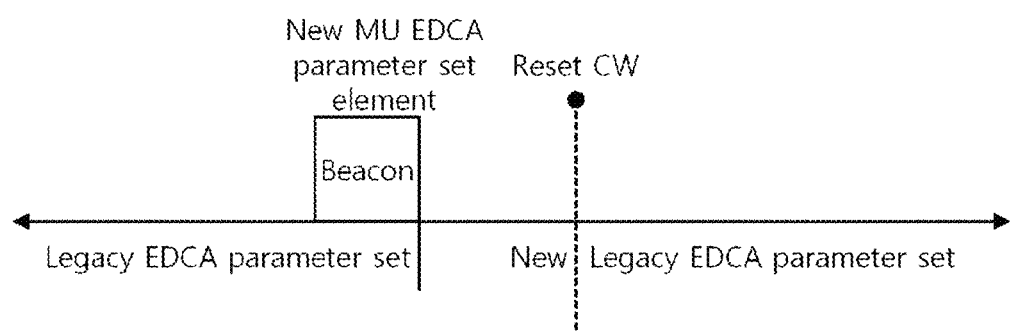
FIG. 21 shows an operation of changing a CW value while a wireless communication terminal according to an embodiment of the present invention changes an EDCA parameter set.

FIG. 21 shows an operation of changing a CW value while a wireless communication terminal according to an embodiment of the present invention changes an EDCA parameter set.

In the embodiment described with reference to FIG. 20, only the operation of the non-legacy wireless communication terminal HE STA is considered. However, a similar problem may occur in a legacy wireless communication terminal non-HE STA to which an MU EDCA parameter set is applied. This is because the legacy wireless communication terminal (e.g., non-HE STA) may change some of the values of the EDCA parameter set. Therefore, the wireless communication terminal may operate as follows in the above-mentioned c).

c) Otherwise c-1-3) When the CW value CW[AC] corresponding to the AC is smaller than the CWmin value CWmin[AC] corresponding to the AC, the wireless communication terminal sets the CW value CW[AC] corresponding to the AC to the CWmin value CWmin [AC].

c-2) When the CW value CW[AC] corresponding to the AC is larger than the CWmin value CWmin[AC] corresponding to AC and equal to or smaller than the CWmax value CWmax[AC], the wireless communication terminal sets the CW value CW[AC] corresponding to AC to (CW[AC]+1)×2-1.

c-3) When the CW value CW[AC] corresponding to the AC is greater than the CWmax value CWmax[AC] corresponding to the AC, the wireless communication terminal sets the CW value CW[AC] corresponding to the AC to the CWmax value CWmax [AC].

In another embodiment, the wireless communication terminal may operate as follows in the above-mentioned c).

c) Otherwise c-1-3) When the CW value CW[AC] corresponding to the AC is smaller than the CWmin value CWmin[AC] corresponding to the AC, the wireless communication terminal sets the CW value CW[AC] corresponding to the AC to the CWmin value CWmin [AC].

c-2) When the CW value CW[AC] corresponding to the AC is larger than the CWmin value CWmin[AC] corresponding to AC and smaller than the CWmax value CWmax [AC], the wireless communication terminal sets the CW value CW[AC] corresponding to AC to (CW[AC]+1)×2-1.

c-3) When the CW value CW[AC] corresponding to the AC is equal to the CWmax value CWmax[AC] corresponding to the AC, the wireless communication terminal does not change the CW value CW[AC] corresponding to the AC.

c-4) When the CW value CW[AC] corresponding to the AC is greater than the CWmax value CWmax[AC] corresponding to the AC, the wireless communication terminal sets the CW value CW[AC] corresponding to the AC to the CWmax value CWmax [AC].

In another embodiment, the wireless communication terminal may operate as follows in the above-mentioned c).

c) Otherwise c-1) When the CW value (CW [AC]) corresponding to the AC is smaller than the CWmax value (CWmax[AC]), the wireless communication terminal sets the CW value (CW [AC]) corresponding to the AC to (CW[AC]+1)×2-1.

c-2) When the CW value (CW[AC]) corresponding to the AC is equal to or greater than the CWmax value (CWmax [AC]) corresponding to the AC, the wireless communication terminal sets the CW value (CW[AC]) corresponding to the AC to the CWmax value (CWmax [AC]).

As described above, the base wireless communication terminal may signal information on the MU EDCA parameter set. The specific format of the information on the MU EDCA parameter set will be described with reference to FIG. 22 to FIG. 23.

Figure 22:
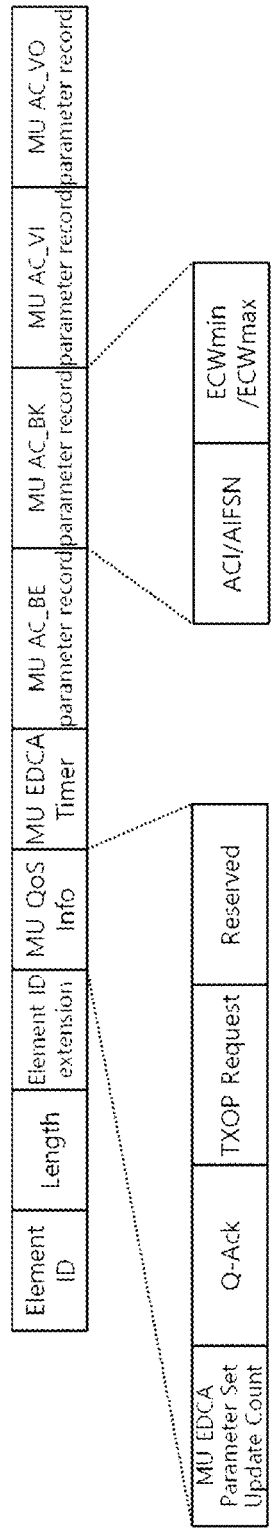
FIG. 22 shows a specific format of an MU EDCA parameter set element according to an embodiment of the present invention.

FIG. 22 shows a specific format of an MU EDCA parameter set element according to an embodiment of the present invention.

The MU EDCA parameter set element according to an embodiment of the present invention includes an Element ID field and an Element ID extension field for identifying the MU EDCA parameter set element. In addition, the MU EDCA parameter set element includes an MU EDCA QoS Info field. The MU EDCA QoS Info field may include an MU EDCA Parameter Set Update Count field whose value is changed whenever the MU EDCA parameter set is changed. Specifically, when the base wireless communication terminal changes the MU EDCA parameter set, the base wireless communication terminal may increment the value of the MU EDCA Parameter Set Update Count field by one. The wireless communication terminal receiving the MU EDCA parameter set element may determine whether to change the MU EDCA parameter set based on the MU EDCA Parameter Set Update Count field value. Other fields in the MU QoS Info field other than the MU EDCA Parameter Set Update Count field may have the same format as the EDCA QoS Info field.

In addition, the MU EDCA parameter set element may include information on the MU EDCA timer. Specifically, the MU EDCA parameter set element may include information indicating the expiration time of the MU EDCA timer.

In addition, the MU EDCA parameter set element includes a plurality of MU AC Parameter Record fields indicating information corresponding to each AC. Specifically, the MU EDCA parameter set element includes an MU AC_BE Parameter Record field, an MU AC_BK Parameter Record field, an MU AC_VI Parameter Record field, and an MU AC_VO Parameter Record field. The MU AC Parameter Record field may include an ACI/AIFSN field and an ECWmin/ECWmax field. The wireless communication terminal receiving the MU EDCA parameter set element applies the MU EDCA parameter set information corresponding to each AC based on the MU AC Parameter Record field. Specifically, the wireless communication terminal receiving the MU EDCA parameter set element sets a management information base (MIB) attribute based on the MU AC Parameter Record field.

Figure 23:
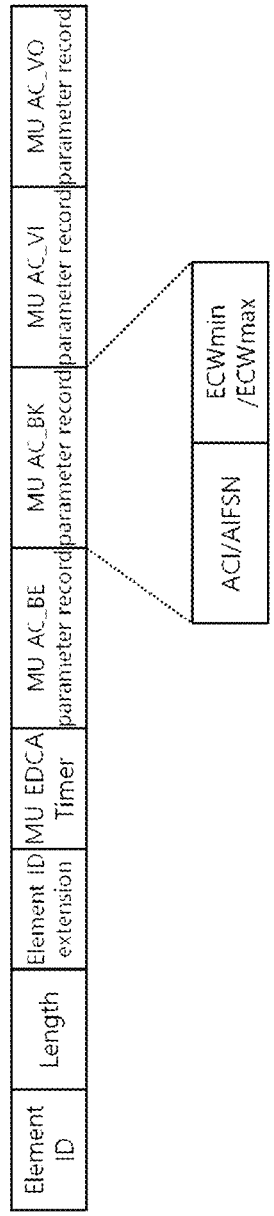
FIG. 23 shows a specific format of an MU EDCA parameter set element according to another embodiment of the present invention.

FIG. 23 shows a specific format of an MU EDCA parameter set element according to another embodiment of the present invention.

Even if the base wireless communication terminal does not transmit the MU EDCA parameter set element in the beacon frame, the base wireless communication terminal may transmit the MU QoS Info field using the beacon frame. Specifically, the base wireless communication terminal may transmit the MU QoS Info field through an element other than the MU EDCA parameter set element. In a specific embodiment, the base wireless communication terminal may transmit the MU QoS Info field through a QoS-related element other than the MU EDCA parameter set element.

In another specific embodiment, the base wireless communication terminal may transmit an MU EDCA parameter set element that does not include an MU QoS Info field. At this time, the specific format of the MU EDCA parameter set element may be as shown in FIG. 23. The wireless communication terminal receiving the QoS Info field may determine whether the wireless communication terminal may not apply the changed EDCA parameter set based on the EDCA Parameter Set Update Count field. When it is determined that the wireless communication terminal does not apply the changed EDCA parameter set and the beacon frame does not include the EDCA parameter set element, the wireless communication terminal may request the transmission of the EDCA parameter set element by transmitting the probe request frame to the base wireless communication terminal. When the base wireless communication terminal is not allowed to transmit the MU QoS Info field together with other elements other than the MU EDCA parameter set element, the MU QoS Info field may not perform the same role as the QoS Info field described above and the need to transmit the MU QoS Info field is also eliminated. Thus, when it is not allowed to transmit the MU QoS Info field together with other elements other than the MU EDCA parameter set element, the base wireless communication terminal may transmit an MU EDCA parameter set element that does not include the MU QoS Info field.

The wireless communication terminal performs an internal contention procedure for data corresponding to each of a plurality of ACs using an internal EDCA queue. Specifically, the wireless communication terminal may operate a plurality of EDCA queues classified according to the access category of data stored in the queue. In addition, the wireless communication terminal may perform a backoff procedure for accessing a channel based on a time corresponding to a backoff timer in each of a plurality of EDCA queues. At this time, a method of using the EDCA queue by the wireless communication terminal will be described in detail with reference to FIG. 24 to FIG. 27.

Figure 24:
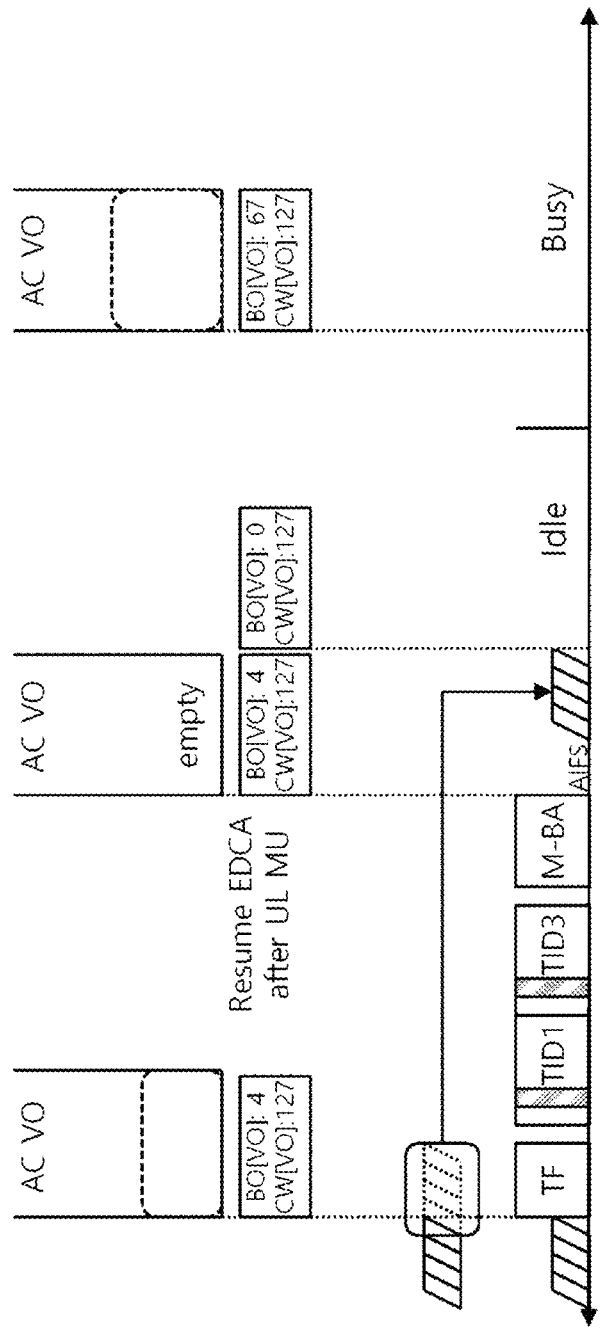
FIG. 24 shows an EDCA operation after UL MU transmission of a wireless communication terminal according to an embodiment of the present invention.

FIG. 24 shows an EDCA operation after UL MU transmission of a wireless communication terminal according to an embodiment of the present invention.

The wireless communication terminal may operate as follows at the boundary of each slot in the backoff procedure.

1) When the backoff timer is not 0, the wireless communication terminal decrements the value of the backoff timer by one.

2) When data is present in the EDCA queue, and the backoff timer is 0, and transmission is not attempted in another EDCA queue with a high user priority (UP), the wireless communication terminal starts a transmission sequence for the data of the corresponding EDCA queue.

3) When data is present in the EDCA queue, and the backoff timer is 0, and transmission is attempted in another EDCA queue with a high user priority (UP), the wireless communication terminal performs an operation according to an internal collision.

4) When other situations, the wireless communication terminal does not perform any operation.

However, when the back off timer is 0 and the EDCA queue of the wireless communication terminal is empty, there is a problem because it is not clearly defined that what kind of operation the wireless communication terminal should perform. Specifically, in the following situations, when the backoff timer is 0, the EDCA queue of the wireless communication terminal may be empty.

As described above, the base wireless communication terminal may trigger the uplink transmission of the wireless communication terminal by transmitting the trigger information. At this time, the base wireless communication terminal may obtain TXOP for transmission of trigger information through a backoff procedure. Therefore, the wireless communication terminal may maintain the backoff timer for AC of the data transmitted through the UL MU transmission in a state before the UL MU transmission. At this time, the wireless communication terminal may attempt to access the channel by resuming the backoff procedure for the corresponding AC. Data may not reach the EDCA queue of the AC until the backoff timer reaches 0.

Also, as described with reference to FIGS. 19 to 21, if it is not the case where the wireless communication terminal attempts transmission and fails, even when the EDCA parameter set is changed, the CW value may be maintained as it is. Also, when the EDCA queue of the corresponding AC is empty and new data arrives in the corresponding EDCA queue, the wireless communication terminal obtains a random integer value within the current CW and sets a backoff timer. Thus, the wireless communication terminal may obtain a new backoff timer using the CW calculated according to the previous EDCA parameter set. For example, in the embodiment of FIG. 24, the wireless communication terminal receives the trigger frame TF from the base wireless communication terminal. At this time, the wireless communication terminal stops the back off procedure for data in which AC is VO. The wireless communication terminal maintains the backoff timer of 4 and the CW value of 127. The wireless communication terminal transmits a trigger-based PPDU including QoS data TID 1 and TID 3 in which AC is VO to the base wireless communication terminal based on the trigger frame. The wireless communication terminal receives the M-BA frame from the base wireless communication terminal. The wireless communication terminal receives the M-BA frame and applies the MU EDCA parameter set as described above. Thereafter, the wireless communication terminal restarts the backoff procedure in which the value of the backoff timer is 4 and the CW value is 127. The channel accessed by the wireless communication terminal is idle for the time corresponding to the AIFS and the time corresponding to the backoff timer value of 4. Therefore, the back off timer becomes 0. However, since the wireless communication terminal transmits all data in which AC is VO using the trigger-based PPDU, the EDCA queue for the VO is empty. When new data arrives in the EDCA queue for the VO of the wireless communication terminal, the wireless communication terminal obtains the random value of 66 within the existing CW value of 127 and sets it as the back off timer value regardless of CWmin and CWmax of the MU EDCA parameter set. Also, regardless of UL MU transmission, if the EDCA queue is empty and the backoff timer is 0, this may happen in the following situations. The wireless communication terminal transmits all data of the EDCA queue for the primary AC, and until the value of the backoff timer reaches 0, additional data may not arrive in the EDCA queue for the primary AC. Also, when the base wireless communication terminal performs DL MU transmission using MU-MIMO or DL OFDMA, the base wireless communication terminal may occupy the channel with the primary AC and transmit the data corresponding to the AC other than the primary AC together with the data corresponding to the primary AC. At this time, a backoff timer corresponding to AC other than the primary AC remains, and the EDCA queue of the corresponding AC may be empty. In addition, if (A-)MSDU corresponding to any AC among the AC with the BA agreement remains and the lifetime of the corresponding MSDU expires, the wireless communication terminal may discard the corresponding (A-)MSDU. At this time, when the EDCA queue for any AC of the wireless communication terminal is empty, the back off timer may reach 0. If the EDCA queue is empty and the backoff timer is 0, the operation of the wireless communication terminal at the slot boundary will be described in detail with reference to FIGS. 25 to 27.

Figure 25:
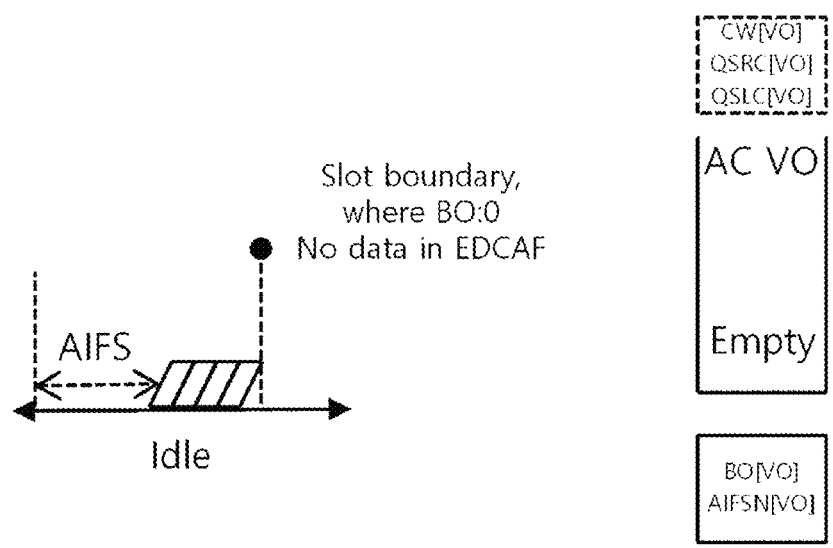
FIG. 25 shows the operation of a wireless communication terminal when the EDCA queue of the wireless communication terminal according to the embodiment of the present invention is empty and the backoff timer is 0.

FIG. 25 shows the operation of a wireless communication terminal when the EDCA queue of the wireless communication terminal according to an embodiment of the present invention is empty and the backoff timer is 0.

When the EDCA queue is empty and the backoff timer is 0, the wireless communication terminal may not perform any operation at the slot boundary. Specifically, the wireless communication terminal may maintain the backoff timer to be 0. Also, the wireless communication terminal may not start the transmission sequence. In a specific embodiment, the wireless communication terminal may maintain all state variables of the EDCA function (EDCAF) without modification. In the embodiment of FIG. 25, when the EDCA queue of the wireless communication terminal for VO is empty, the backoff timer BO[VO] reaches 0. At this time, the wireless communication terminal does not perform any operation.

Figure 26:
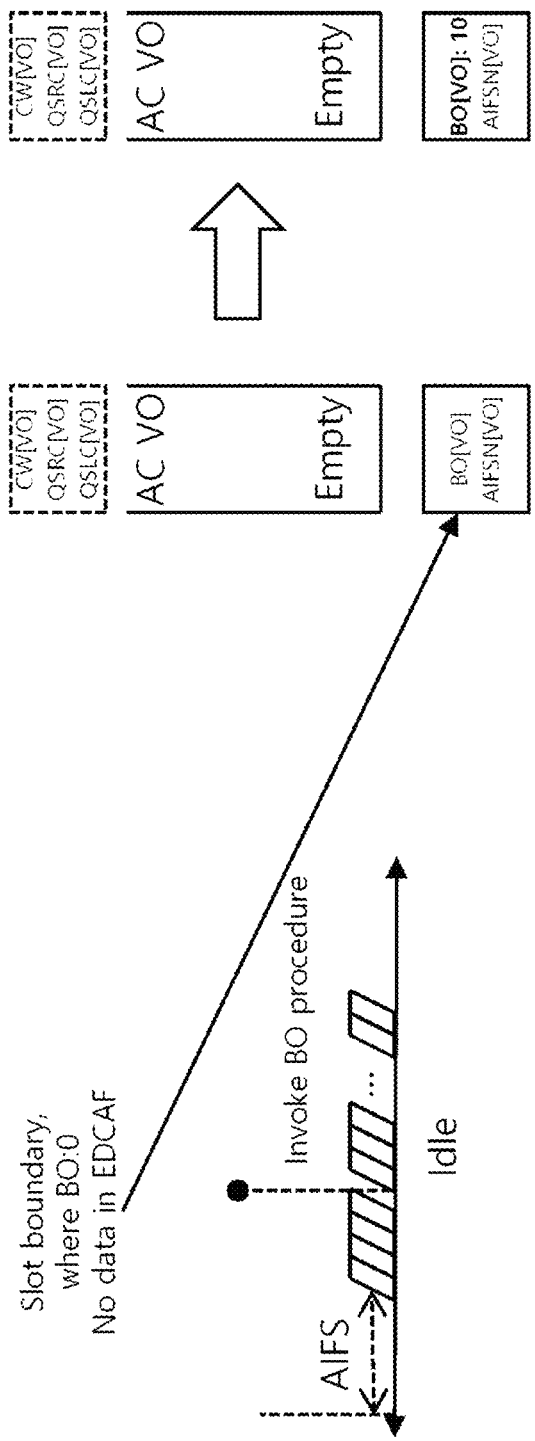
FIG. 26 shows the operation of a wireless communication terminal when the EDCA queue of the wireless communication terminal according to another embodiment of the present invention is empty and the backoff timer is 0.

FIG. 26 shows the operation of a wireless communication terminal when the EDCA queue of the wireless communication terminal according to another embodiment of the present invention is empty and the backoff timer is 0.

When the EDCA queue is empty and the backoff timer is 0, the wireless communication terminal may resume the backoff procedure at the slot boundary. At this time, the wireless communication terminal may maintain the CW value without modification. This is because it is not the case that the wireless communication terminal fails to transmit, and there is no need to double CW. Specifically, the wireless communication terminal may maintain all the state variables of the EDCAF except for the backoff timer. Also, when the EDCA queue is empty and the backoff timer is 0 again, the wireless communication terminal may start the backoff procedure again. In the embodiment of FIG. 26, when the EDCA queue of the wireless communication terminal for VO is empty, the backoff timer BO[VO] reaches 0. The wireless communication terminal obtains a random value of 10 within the CW CW[VO] corresponding to the VO while maintaining all other EDCAF state variables, and sets the backoff timer BO[VO] using 10.

Figure 27:
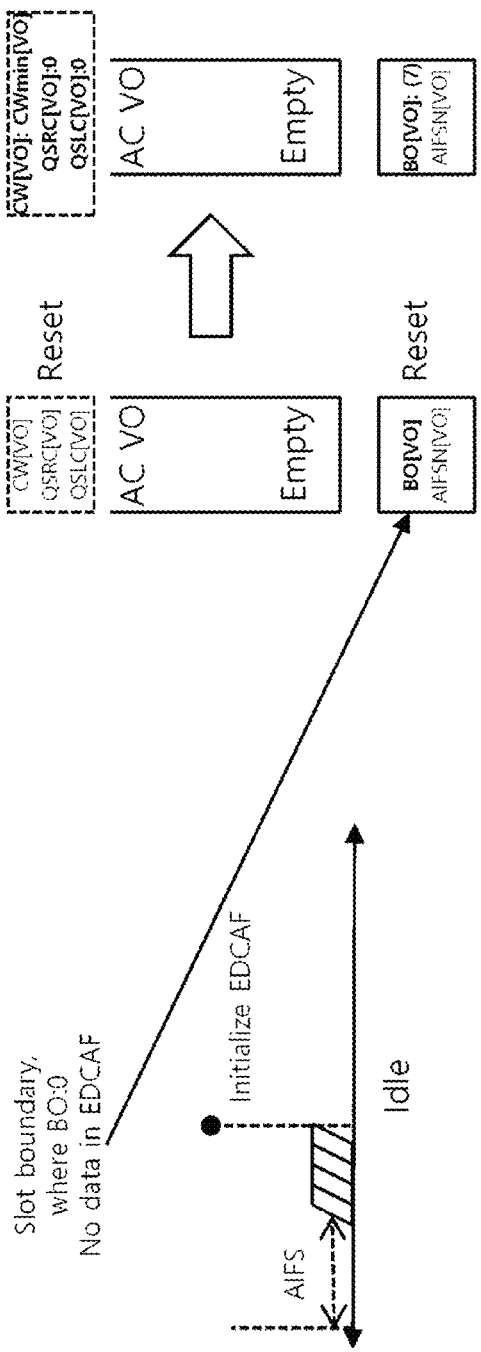
FIG. 27 shows the operation of a wireless communication terminal when the EDCA queue of the wireless communication terminal according to another embodiment of the present invention is empty and the backoff timer is 0.

FIG. 27 shows the operation of a wireless communication terminal when the EDCA queue of the wireless communication terminal according to another embodiment of the present invention is empty and the backoff timer is 0.

When the EDCA queue is empty and the backoff timer is 0, the wireless communication terminal may initiate the EDCAF at the slot boundary. At this time, the wireless communication terminal may set CW to CWmin. Also, the wireless communication terminal may set QSRC and OLRC to initial values. Specifically, the wireless communication terminal may set QSRC and OLRC to 0. The wireless communication terminal initializes the EDCAF and then starts the backoff procedure again. At this time, the wireless communication terminal may maintain the CW value without modification. This is because it is not the case that the wireless communication terminal fails to transmit, and there is no need to double CW.

In addition, when the EDCA queue is empty and the backoff timer is 0 again, the wireless communication terminal may initiate the EDCAF at the slot boundary again. When the state variable of the EDCAF maintains the initial value to prevent meaningless initialization, the wireless communication terminal may not perform initialization.

Figure 28:
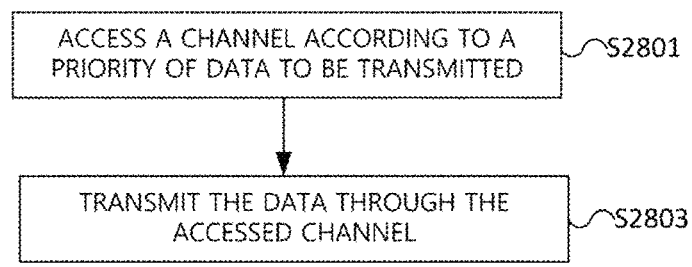
FIG. 28 shows the operation of a wireless communication terminal according to an embodiment of the present invention.

FIG. 28 shows the operation of a wireless communication terminal according to an embodiment of the present invention.

The wireless communication terminal according to an embodiment of the present invention accesses the channel according to the priority of data to be transmitted (S2801). Specifically, the wireless communication terminal may access the channel according to the EDCA procedure described above. At this time, the wireless communication terminal may be a base wireless communication terminal. In addition, the wireless communication terminal may be a wireless communication terminal associated with the base wireless communication terminal.

The wireless communication terminal that wirelessly communicates with a base wireless communication terminal may switch a parameter set used for channel access from a first parameter set to a second parameter set based on whether the UL MU transmission is scheduled. Specifically, the wireless communication terminal may switch the parameter set used for channel access from the first parameter set to the second parameter set based on whether the base wireless communication terminal triggers the UL MU transmission participation of the wireless communication terminal. Further, the base wireless communication terminal transmits a trigger frame to the wireless communication terminal, and the base wireless communication terminal may trigger the UL MU transmission participation of the wireless communication terminal. Depending on whether the user info field of the trigger frame includes the AID of the wireless communication terminal, the wireless communication terminal may determine whether the base wireless communication terminal triggers the UL MU transmission participation of the wireless communication terminal.

At this time, the parameter set used for the channel access may be a set of parameters used to access the channel according to the priority of the data. Specifically, the parameter set used for channel access may be the EDCA parameter set described above. Specifically, the EDCA parameter set may include parameters for CW. At this time, the parameter for CW may include at least one of CWmin and CWmax. In addition, the EDCA parameter set may include a parameter value related to a predetermined time at which the wireless communication terminal waits to start the backoff procedure. At this time, the predetermined time may be the AIFS described above.

In addition, the wireless communication terminal may determine whether to switch from the first parameter set to the second parameter set for each access category of data. Further, when the wireless communication terminal transmits the BSR, the wireless communication terminal may switch from the first parameter set to the second parameter set. In another specific embodiment, the wireless communication terminal may switch from the first parameter set to the second parameter set when the wireless communication terminal obtains information on the UL MU transmission. In another specific embodiment, the wireless communication terminal may transmit the trigger-based PPDU to the base wireless communication terminal according to the triggering of the base wireless communication terminal. At this time, the wireless communication terminal may switch from the first parameter set to the second parameter set according to an immediate response to the MPDU included in the trigger-based PPDU. At this time, the wireless communication terminal may switch from the first parameter set to the second parameter set when the wireless communication terminal receive an immediate response to the MPDU included in the trigger-based PPDU. The MPDU included in the trigger-based PPDU may be a QoS data frame.

When the second parameter set application condition is not satisfied until a certain time elapses from when the timer is set, the wireless communication terminal may set the second parameter set timer for terminating the MU EDCA parameter set application. Specifically, based on whether the wireless communication terminal receives an immediate response to the MPDU included in the trigger-based PPDU, the wireless communication terminal may set the second parameter set timer according to the immediate response reception. When the second parameter set timer expires, the wireless communication terminal may be allowed to terminate the second parameter set application. Further, when the wireless communication terminal switches from the first parameter set to the second parameter set, the wireless communication terminal may set the second parameter set timer. In addition, the wireless communication terminal may determine when to switch from the first parameter set to the second parameter set based on the type of responding requested by the MPDU included in the trigger-based PPDU. In addition, the wireless communication terminal may determine when to set the second parameter set timer based on the type of responding requested by the MPDU included in the trigger-based PPDU. When the MPDU included in the trigger-based PPDU transmitted by the wireless communication terminal does not request the ACK, the wireless communication terminal may set the second parameter set timer when the transmission of the trigger-based PPDU ends. In addition, the wireless communication terminal may set a second parameter set timer for each access category. Specifically, when the MPDU included in the trigger-based PPDU does not request an ACK, the wireless communication terminal may switch the parameter set from the first parameter set to the second parameter set and set the second parameter set timer when the transmission of the trigger based PPDU ends. As described above, the MPDU included in the trigger-based PPDU may be a QoS data frame. The specific operation of the wireless communication terminal may be the same as that described with reference to FIG. 6 through FIG. 18.

In addition, while the wireless communication terminal performs the backoff procedure, the parameters of the parameter set used in the backoff procedure may be changed. When the CW value is larger than CWmax, the wireless communication terminal may set the CW value to CWmax. In addition, when the CW value is smaller than CWmin, the wireless communication terminal may set the CW value to CWmin. Specifically, when the wireless communication terminal switches the currently used first parameter set to the second parameter set, the wireless communication terminal may change the value of the backoff timer currently used in the backoff procedure based on the second parameter set. In a specific embodiment, the wireless communication terminal may multiply the backoff timer currently used in the backoff procedure with a value determined based on the second parameter set. When the wireless communication terminal switches the currently used first parameter set to the second parameter set, the wireless communication terminal may change the parameter value for CW currently used in the backoff procedure based on the second parameter set. At this time, the parameter for CW may include CWmin and CWmax. Specifically, the wireless communication terminal may operate in the same manner as the embodiments described with reference to FIGS. 19 to 21.

The wireless communication terminal may operate a plurality of queues classified according to the access category of data stored in the queue. In addition, the wireless communication terminal may perform a backoff procedure for accessing a channel based on a time corresponding to a backoff timer in each of a plurality of queues. At this time, the queue may represent the EDCA queue described above. When there is no data stored in the queue and the backoff timer corresponding to the queue is 0, the wireless communication terminal may not perform any operation at the slot boundary. At this time, the wireless communication terminal may maintain the backoff timer to be 0. In another specific embodiment, the wireless communication terminal may resume the backoff procedure at the slot boundary. At this time, the wireless communication terminal may maintain the CW value without modification. In another specific embodiment, the wireless communication terminal may initialize a set of channel access parameters at a slot boundary. At this time, the wireless communication terminal may set CW to CWmin. Also, the wireless communication terminal may set QSRC and OLRC to initial values. Specifically, the wireless communication terminal may set QSRC and OLRC to 0. Specifically, the wireless communication terminal may operate in the same manner as the embodiments described with reference to FIGS. 24 to 27.

The wireless communication terminal transmits the data through the accessed channel (S2803).

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A wireless communication terminal that wirelessly communicates with a base wireless communication terminal, the wireless communication terminal comprising:
    a transceiver; and
    a processor,
    wherein the processor is configured to: receive a trigger frame from the base wireless communication terminal, transmit, to the base wireless communication terminal, a trigger-based physical layer protocol data unit (PPDU) in response to the trigger frame using the transceiver, wherein the trigger frame triggers a orthogonal frequency division multiple access (OFDMA) uplink transmission of the wireless communication terminal,
    switch a parameter set, which is a set of parameters used for a channel access, from a first parameter set to a second parameter set based on whether the base wireless communication terminal triggers a multi-user uplink transmission participation of the wireless communication terminal,
    when a MAC protocol data unit (MPDU) included in the trigger-based PPDU does not request an immediate response, set a second parameter set timer for an access category of the MPDU when the transmission of the trigger-based PPDU ends,
    when the MPDU included in the trigger-based PPDU requests an immediate response, set the second parameter set timer for the access category of the MPDU for which immediate response is received,
    when the second parameter set timer expires, terminate an application of the second parameter set, and
    access a channel according to a priority of data to be transmitted to the base wireless communication terminal by the wireless communication terminal and the parameter set.

2. The wireless communication terminal of claim 1, wherein the MPDU included in the trigger-based PPDU is a QoS data frame.

3. The wireless communication terminal of claim 1, wherein the processor is configured to receive a beacon frame from the base wireless communication terminal and obtain information indicating a period of the second parameter set timer from the beacon frame.

4. The wireless communication terminal of claim 1, wherein the processor is configured to calculate a random integer value within a contention window (CW),
    set a backoff timer based on the random integer value, and
    access the channel based on the back-off timer and a predetermined slot time,
    wherein the parameter set comprises a minimum value (CWmin) of the CW and a maximum value (CWmax) of the CW.

5. The wireless communication terminal of claim 4, wherein the processor is configured to
    if a value of the CW is greater than the CWmax of the CW according to a priority of the data to be transmitted, set the value of the CW to the CWmax.

6. The wireless communication terminal of claim 1, wherein the processor is configured to operate a plurality of queues that are classified according to an access category of data stored in a queue and performs backoff procedure of accessing a channel based on a time corresponding to a backoff timer in each of the plurality of queues, and
    when there is no data stored in the queue and the backoff timer corresponding to the queue is 0, perform no operation at a slot boundary of the backoff timer,
    wherein the backoff timer is set based on a random integer value calculated in a contention window (CW), and is reduced when the channel is idle for a predetermined slot time.

7. The wireless communication terminal of claim 6, wherein when there is no data stored in the queue and the backoff timer corresponding to the queue is 0, the processor is configured to maintain the backoff timer to be 0.

8. A method of a wireless communication terminal that wirelessly communicates with a base wireless communication terminal, the method comprising:
    receiving a trigger frame from the base wireless communication terminal;
    transmitting, to the base wireless communication terminal, a trigger-based physical layer protocol data unit (PPDU) in response to the trigger frame, wherein the trigger frame triggers a orthogonal frequency division multiple access (OFDMA) uplink transmission of the wireless communication terminal;
    switching a parameter set, which is a set of parameters used for a channel access, from a first parameter set to a second parameter set based on whether the base wireless communication terminal triggers a multi-user uplink transmission participation of the wireless communication terminal;
    when a MAC protocol data unit (MPDU) included in the trigger-based PPDU does not request an immediate response, setting a second parameter set timer for an access category of the MPDU when the transmission of the trigger-based PPDU ends;
    when the MPDU included in the trigger-based PPDU requests the immediate response, setting the second parameter set timer for the access category of the MPDU for which immediate response is received;
    when the second parameter set timer expires, terminating an application of the second parameter set;
    accessing a channel according to a priority of data to be transmitted to the base wireless communication terminal and the parameter set; and
    transmitting the data through the channel.

9. The method of claim 8, wherein the MPDU included in the trigger-based PPDU is a QoS data frame.

10. The method of claim 8, the method further comprising:
- receiving a beacon frame from the base wireless communication terminal; and
- obtaining information indicating a period of the second parameter set timer from the beacon frame.

* * * * *